US012720221B2

(12) United States Patent
Berner et al.

(10) Patent No.: US 12,720,221 B2
(45) Date of Patent: Aug. 25, 2026

(54) SENSOR DEVICE AND METHOD FOR OPERATING A SENSOR DEVICE

(71) Applicant: Sony Semiconductor Solutions Corporation, Atsugi (JP)

(72) Inventors: Raphael Berner, Stuttgart (DE); Massimo Zannoni, Stuttgart (DE)

(73) Assignee: Sony Semiconductor Solutions Corporation, Atsugi (JP)

( * ) Notice: Subject to any disclaimer, the term of this patent is extended or adjusted under 35 U.S.C. 154(b) by 30 days.

(21) Appl. No.: 18/839,444

(22) PCT Filed: Feb. 7, 2023

(86) PCT No.: PCT/EP2023/052898
§ 371 (c)(1),
(2) Date: Aug. 19, 2024

(87) PCT Pub. No.: WO2023/161055
PCT Pub. Date: Aug. 31, 2023

(65) Prior Publication Data

US 2025/0159368 A1 May 15, 2025

(30) Foreign Application Priority Data

Feb. 28, 2022 (EP) .................................... 22159210

(51) Int. Cl.
*H04N 25/46* (2023.01)
*H04N 25/47* (2023.01)

(52) U.S. Cl.
CPC ............. *H04N 25/46* (2023.01); *H04N 25/47* (2023.01)

(58) Field of Classification Search
CPC ............................... H04N 25/46; H04N 25/47
See application file for complete search history.

(56) References Cited

U.S. PATENT DOCUMENTS

2015/0194454 A1* 7/2015 Kim ...................... H10F 39/811 250/208.1
2016/0028985 A1* 1/2016 Vogelsang ............ H10F 39/813 348/294
2020/0137333 A1* 4/2020 Suh ........................ H04N 25/00
2020/0154064 A1 5/2020 Berner et al.
2022/0038645 A1* 2/2022 Takahashi .............. H04N 25/46

FOREIGN PATENT DOCUMENTS

WO 2020/196092 A1 10/2020
WO 2020/241108 A1 12/2020
WO WO-2023161005 A1 * 8/2023 ............. H04N 25/47

OTHER PUBLICATIONS

International Search Report and Written Opinion mailed on Mar. 30, 2023, received for International Application No. PCT/EP2023/052898, filed on Feb. 7, 2023, 9 pages.

* cited by examiner

*Primary Examiner* — Amy R Hsu
(74) *Attorney, Agent, or Firm* — XSENSUS LLP

(57) ABSTRACT

A sensor device includes multiple pixels for receiving light and converting it into photocurrents, which are then transformed into photovoltages by corresponding current-voltage converters. Each photovoltage is stored in a capacitor linked to its converter. The device features event detection units that identify changes in light intensity based on these photovoltages, determining if they exceed a set threshold. The device's circuitry enables two operation modes: one where an event detection unit receives the photovoltage from a single pixel, and another where it receives a combined photovoltage from multiple pixels.

19 Claims, 22 Drawing Sheets

41
PIXEL BLOCK
CONTROL SIGNAL
OFG1
TRG1
OFG2
TRG2
53
RST
SEL
PIXEL SIGNAL GENERATING SECTION
VDD
71
72
73
74
VSL
PIXEL
51
61
62
63
60
EVENT DETECTING SECTION
52
EVENT DATA
REQUEST, RESPONSE
CONTROL SIGNAL

PHOTOVOLTAGE
83
SUBTRACTION SECTION
101
102
OPERATIONAL AMPLIFIER
103
104
CONTROL SIGNAL
84
QUANTIZATION SECTION
111
COMPARATOR
+
−
Vth
QUANTIZED VALUE

83
SUBTRACTION SECTION
DIFFERENCE SIGNAL
84
QUANTIZATION SECTION
111
COMPARATOR
+
−
Vth
112
COMPARATOR
−
+
Vth'
0 or 1
0 or 1
113
OUTPUT SECTION
EVENT DATA
(−1 or 0 or +1)

10
20
81
51
40
54
56
58
VDD
50-2
50-4
50-6
50-8
30

10
55a
55b
S
VDD
55
20
20
VDD
58
30
54
40
56
54
40
55
VDD
45
45
81
92
VDD
61
61

SENSOR DEVICE AND METHOD FOR OPERATING A SENSOR DEVICE

CROSS-REFERENCE TO RELATED APPLICATIONS

The present disclosure is a national stage application, pursuant to 35 U.S.C. § 371, of International Patent Application No. PCT/EP2023/052898, filed Feb. 7, 2023, which claims priority from European Patent Application No. 22159210.8, filed Feb. 28, 2022, the entire contents of each are incorporated herein by reference.

FIELD OF THE INVENTION

The present technology relates to a sensor device and a method for operating a sensor device, in particular, to a sensor device and a method for operating a sensor device that allow binning of dynamic vision sensor, DVS, pixels.

BACKGROUND

In typical event vision sensors, EVS, or dynamic vision sensors, DVS, each pixel signal is processed separately to see whether a change in intensity occurred that triggers an event. Here, usually the sensitivity achievable by each processing chain is fixed by the design of the sensor and cannot be adapted dynamically.

Increasing the sensitivity by solutions known from active pixel sensors, APS, that capture full frame images synchronously, cannot be applied in a straightforward manner to EVS/DVS systems. For example, combining the photocurrents produced by several pixels will not improve the sensitivity of an EVS/DVS, since in EVS/DVS systems the sensitivity is set by the readout circuitry.

A further known approach is to combine signals at the level of current-voltage conversion, i.e. to feed the photocurrent from several pixels to a current conversion section that is formed from several one-pixel current conversion sections. However, this has the drawback of a rather involved circuitry. Further, such approaches usually shorten photodiode outputs of different pixels, and potentially also outputs and internal nodes of current-voltage conversion circuits, which creates additional parasitic capacitance at these nodes. This might alter the bandwidth of the circuitry or might even create false events by unexpected coupling into the nodes.

It is therefore desirable to improve the binning circuitry of sensor devices to allow dynamic enhancement of the sensor sensitivity.

SUMMARY OF INVENTION

To this end, a sensor device is provided that comprises a plurality of pixels each configured to receive light and to perform photoelectric conversion to generate a photocurrent, a plurality of current-voltage converting sections, each being connected to the output of one corresponding pixel to convert the photocurrent from said pixel to a photovoltage, a plurality of capacitors, each being connected to the output of one corresponding current-voltage converting section to receive the photovoltage from said current-voltage converting section, a plurality of event detection units each configured to detect based on the photovoltages as an event whether a change in light intensity received by one or several pixels is above a predetermined threshold, and circuitry that connects the plurality of capacitors and the plurality of event detection units such as to allow changing between a first operation mode in which at least one event detection unit receives the photovoltage of only one pixel via the corresponding capacitor, and a second operation mode in which the at least one event detection unit receives a combination of photovoltages from the one pixel and at least another pixel via the corresponding capacitors.

Further, a method for operating a sensor device comprises: receiving light and performing photoelectric conversion to generate a photocurrent with a plurality of pixels of the sensor device; converting the photocurrent from each pixel to a photovoltage with a plurality of current-voltage converting sections, each being connected to the output of one corresponding pixel; transferring the photovoltage from each current-voltage converting section to a plurality of capacitors, each being connected to the output of one corresponding current-voltage converting section; detecting, by a plurality of event detection units, based on the photovoltages as an event whether a change in light intensity received by one or several pixels is above a predetermined threshold; and changing, by circuitry that connects the plurality of capacitors and the plurality of event detection units, between a first operation mode in which at least one event detection unit receives the photovoltage of only one pixel via the corresponding capacitor, and a second operation mode in which the at least one event detection unit receives a combination of photovoltages from the one pixel and at least another pixel via the corresponding capacitors.

Instead of binning photocurrents after the stage of the photoelectric conversion elements of the pixels, or by combining different current-voltage converting sections, the binning of different signals is made before the input to the event detection circuitry, in particular before the part of the event detection logic where the temporal signal change is determined and compared to the event threshold.

Combining the signals of different current-voltage converting sections in this manner will improve the root mean square noise at the following stages, which would not be the case, if the photocurrents were combined directly. This allows using lower event thresholds without deteriorating the image capturing results by an excessive amount of events caused by noise.

Further, by transferring the generated voltages to the event detection logic via capacitors and by binning on the event detection logic side of the capacitors, less deterioration due to parasitic effects will occurs. In addition, the circuitry can be simplified considerably.

As the sensor device is able to operate without binning (first operation mode) and with binning (second operation mode), it is also possible to adapt the sensitivity of the sensor device dynamically.

DETAILED DESCRIPTION

The present disclosure is directed to mitigating the problem of fixed sensitivity of event detection pixels. In particular, the problem is addressed how to allow adaption of the sensitivity by binning of photovoltages. The solution to this problem discussed below is applicable to all kinds of event detection systems. However, in order to ease the description and also in order to cover an important application example, the present description is given without prejudice based on a specific example of a DVS/EVS. It has to be understood that although in the following often reference will be made to the circuitry of this DVS/EVS, the discussed binning of photovoltages can be applied in principle to all pixel based event detection sensors.

First, a possible implementation of a DVS/EVS will be described. It has to be emphasized again that this is purely exemplary. It is to be understood that DVSs/EVSs could also be implemented differently.

Figure 1:
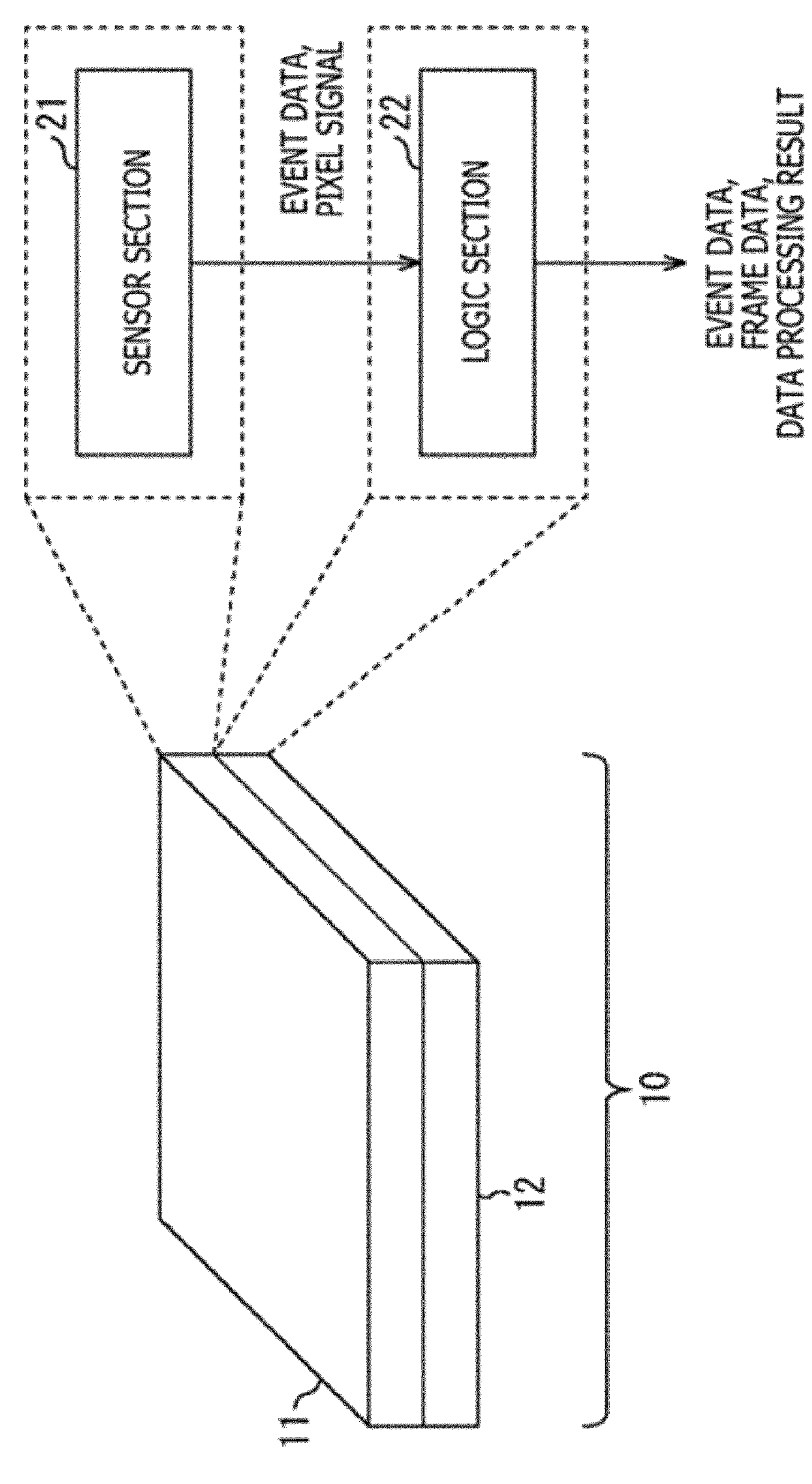
FIG. 1 is a schematic diagram of a sensor device.

FIG. 1 is a diagram illustrating a configuration example of a sensor device 10, which is in the example of FIG. 1 constituted by a sensor chip.

The sensor device 10 is a single-chip semiconductor chip and includes a sensor die (substrate) 11, which serves as a plurality of dies (substrates), and a logic die 12 that are stacked. Note that, the sensor device 10 can also include only a single die or three or more stacked dies.

In the sensor device 10 of FIG. 1, the sensor die 11 includes (a circuit serving as) a sensor section 21, and the logic die 12 includes a logic section 22. Note that, the sensor section 21 can be partly formed on the logic die 12. Further, the logic section 22 can be partly formed on the sensor die 11.

The sensor section 21 includes pixels configured to perform photoelectric conversion on incident light to generate electrical signals, and generates event data indicating the occurrence of events that are changes in the electrical signal of the pixels. The sensor section 21 supplies the event data to the logic section 22. That is, the sensor section 21 performs imaging of performing, in the pixels, photoelectric conversion on incident light to generate electrical signals, similarly to a synchronous image sensor, for example. The sensor section 21, however, generates event data indicating the occurrence of events that are changes in the electrical signal of the pixels instead of generating image data in a frame format (frame data). The sensor section 21 outputs, to the logic section 22, the event data obtained by the imaging.

Here, the synchronous image sensor is an image sensor configured to perform imaging in synchronization with a vertical synchronization signal and output frame data that is image data in a frame format. The sensor section 21 can be regarded as asynchronous (an asynchronous image sensor) in contrast to the synchronous image sensor, since the sensor section 21 does not operate in synchronization with a vertical synchronization signal when outputting event data.

Note that, the sensor section 21 can generate and output, other than event data, frame data, similarly to the synchronous image sensor. In addition, the sensor section 21 can output, together with event data, electrical signals of pixels in which events have occurred, as pixel signals that are pixel values of the pixels in frame data.

The logic section 22 controls the sensor section 21 as needed. Further, the logic section 22 performs various types of data processing, such as data processing of generating frame data on the basis of event data from the sensor section 21 and image processing on frame data from the sensor section 21 or frame data generated on the basis of the event data from the sensor section 21, and outputs data processing results obtained by performing the various types of data processing on the event data and the frame data.

Figure 2:
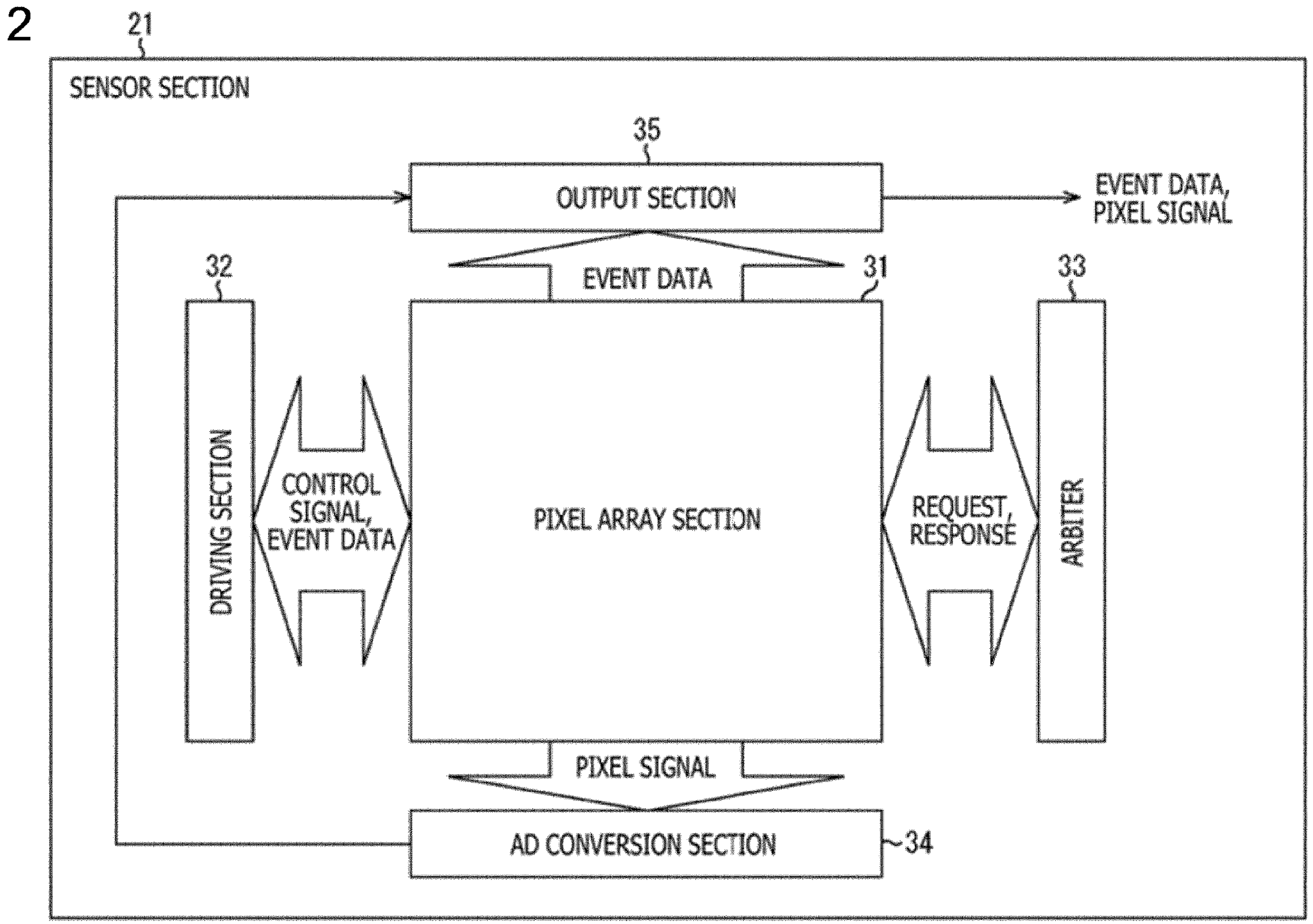
FIG. 2 is a schematic block diagram of a sensor section.

FIG. 2 is a block diagram illustrating a configuration example of the sensor section 21 of FIG. 1.

The sensor section 21 includes a pixel array section 31, a driving section 32, an arbiter 33, an optional AD (Analog to Digital) conversion section 34 needed e.g. in a hybrid EVS-RGB sensor, and an output section 35.

The pixel array section 31 includes a plurality of pixels 51 (FIG. 3) arrayed in a two-dimensional lattice pattern. The pixel array section 31 detects, in a case where a change larger than a predetermined threshold (including a change equal to or larger than the threshold as needed) has occurred in (a voltage corresponding to) a photocurrent that is an electrical signal generated by photoelectric conversion in the pixel 51, the change in the photocurrent as an event. In a case of detecting an event, the pixel array section 31 outputs, to the arbiter 33, a request for requesting the output of event data indicating the occurrence of the event. Then, in a case of receiving a response indicating event data output permission from the arbiter 33, the pixel array section 31 provides control signals to the driving section 32 and the output section 35. In addition, the pixel array section 31 outputs an electrical signal of the pixel 51 in which the event has been detected to the (optional) AD conversion section 34, as a pixel signal.

The driving section 32 supplies control signals to the pixel array section 31 to drive the pixel array section 31. For example, the driving section 32 drives the pixel 51 regarding which the pixel array section 31 has output event data, so that the pixel 51 in question supplies (outputs) a pixel signal to the AD conversion section 34.

The arbiter 33 arbitrates the requests for requesting the output of event data from the pixel array section 31, and returns responses indicating event data output permission or prohibition to the pixel array section 31.

The AD conversion section 34 includes, for example, a single-slope ADC (AD converter) (not illustrated) in each column of pixel blocks 41 (FIG. 3) described later, for example. The AD conversion section 34 performs, with the ADC in each column, AD conversion on pixel signals of the pixels 51 of the pixel blocks 41 in the column, and supplies the resultant to the output section 35. Note that, the AD conversion section 34 can perform CDS (Correlated Double Sampling) together with pixel signal AD conversion.

The output section 35 performs necessary processing on the pixel signals from the AD conversion section 34 and the event data from the pixel array section 31 and supplies the resultant to the logic section 22 (FIG. 1).

Here, a change in the photocurrent generated in the pixel 51 can be recognized as a change in the amount of light entering the pixel 51, so that it can also be said that an event is a change in light amount (a change in light amount larger than the threshold) in the pixel 51.

Event data indicating the occurrence of an event at least includes location information (coordinates or the like) indicating the location of a pixel block in which a change in light amount, which is the event, has occurred. Besides, the event data can also include the polarity (positive or negative) of the change in light amount.

With regard to the series of event data that is output from the pixel array section 31 at timings at which events have occurred, it can be said that, as long as the event data interval is the same as the event occurrence interval, the event data implicitly includes time point information indicating (relative) time points at which the events have occurred. However, for example, when the event data is stored in a memory and the event data interval is no longer the same as the event occurrence interval, the time point information implicitly included in the event data is lost. Thus, the output section 35 includes, in event data, time point information indicating (relative) time points at which events have occurred, such as timestamps, before the event data interval is changed from the event occurrence interval. The processing of including time point information in event data can be performed in any block other than the output section 35 as long as the processing is performed before time point information implicitly included in event data is lost.

Figure 3:
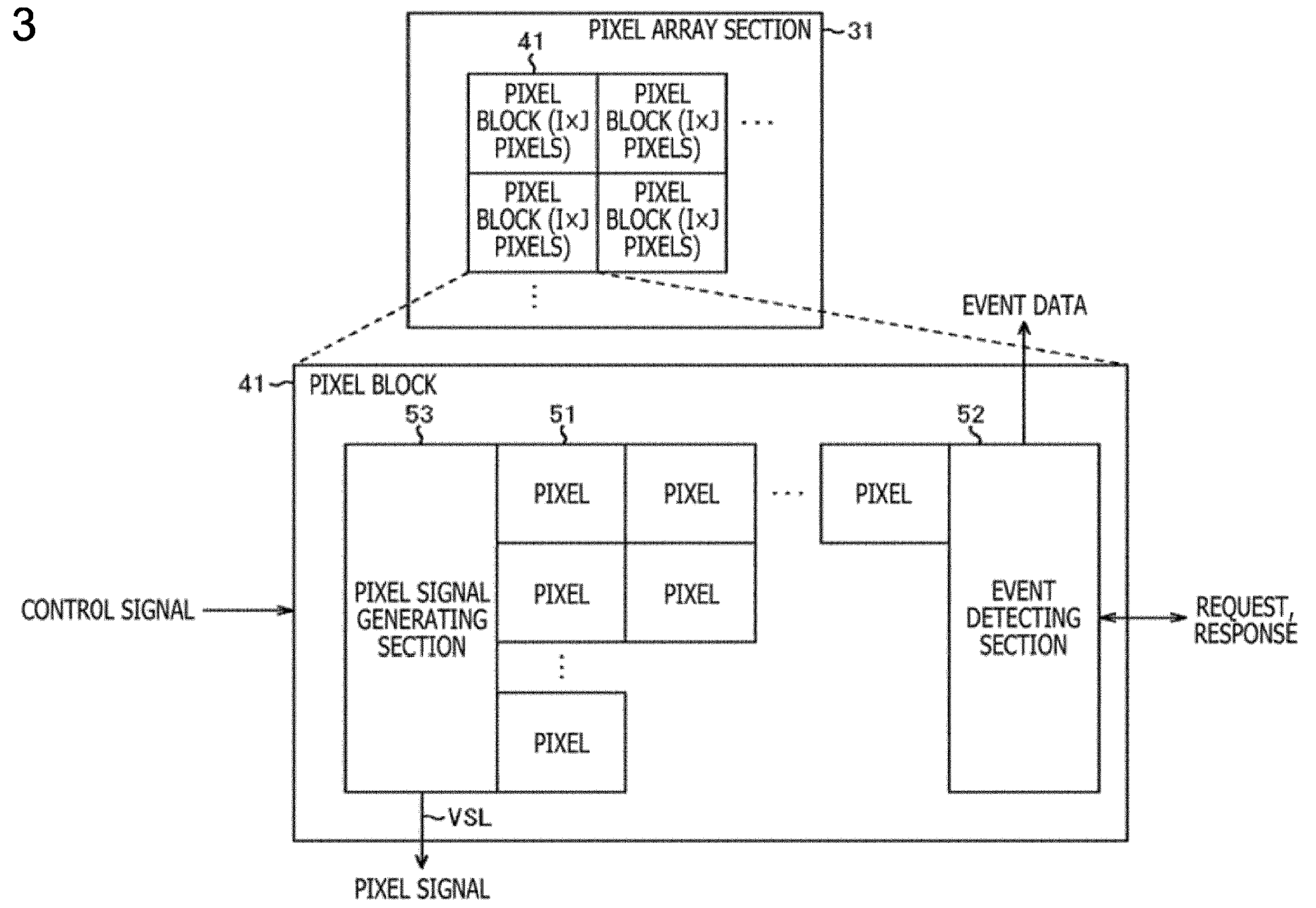
FIG. 3 is a schematic block diagram of a pixel array section.

FIG. 3 is a block diagram illustrating a configuration example of the pixel array section 31 of FIG. 2.

The pixel array section 31 includes the plurality of pixel blocks 41. The pixel block 41 includes the I×J pixels 51 that are one or more pixels arrayed in I rows and J columns (I and J are integers), an event detecting section 52, and a pixel signal generating section 53. The one or more pixels 51 in the pixel block 41 share the event detecting section 52 and the pixel signal generating section 53. Further, in each column of the pixel blocks 41, a VSL (Vertical Signal Line) for connecting the pixel blocks 41 to the ADC of the AD conversion section 34 is wired.

The pixel 51 receives light incident from an object and performs photoelectric conversion to generate a photocurrent serving as an electrical signal. The pixel 51 supplies the photocurrent to the event detecting section 52 under the control of the driving section 32.

The event detecting section 52 detects, as an event, a change larger than the predetermined threshold in photocurrent from each of the pixels 51, under the control of the driving section 32. In a case of detecting an event, the event detecting section 52 supplies, to the arbiter 33 (FIG. 2), a request for requesting the output of event data indicating the occurrence of the event. Then, when receiving a response indicating event data output permission to the request from the arbiter 33, the event detecting section 52 outputs the event data to the driving section 32 and the output section 35.

The pixel signal generating section 53 generates, in the case where the event detecting section 52 has detected an event, a voltage corresponding to a photocurrent from the pixel 51 as a pixel signal, and supplies the voltage to the AD conversion section 34 through the VSL, under the control of the driving section 32.

Here, detecting a change larger than the predetermined threshold in photocurrent as an event can also be recognized as detecting, as an event, absence of change larger than the predetermined threshold in photocurrent. The pixel signal generating section 53 can generate a pixel signal in the case where absence of change larger than the predetermined threshold in photocurrent has been detected as an event as well as in the case where a change larger than the predetermined threshold in photocurrent has been detected as an event.

Figure 4:
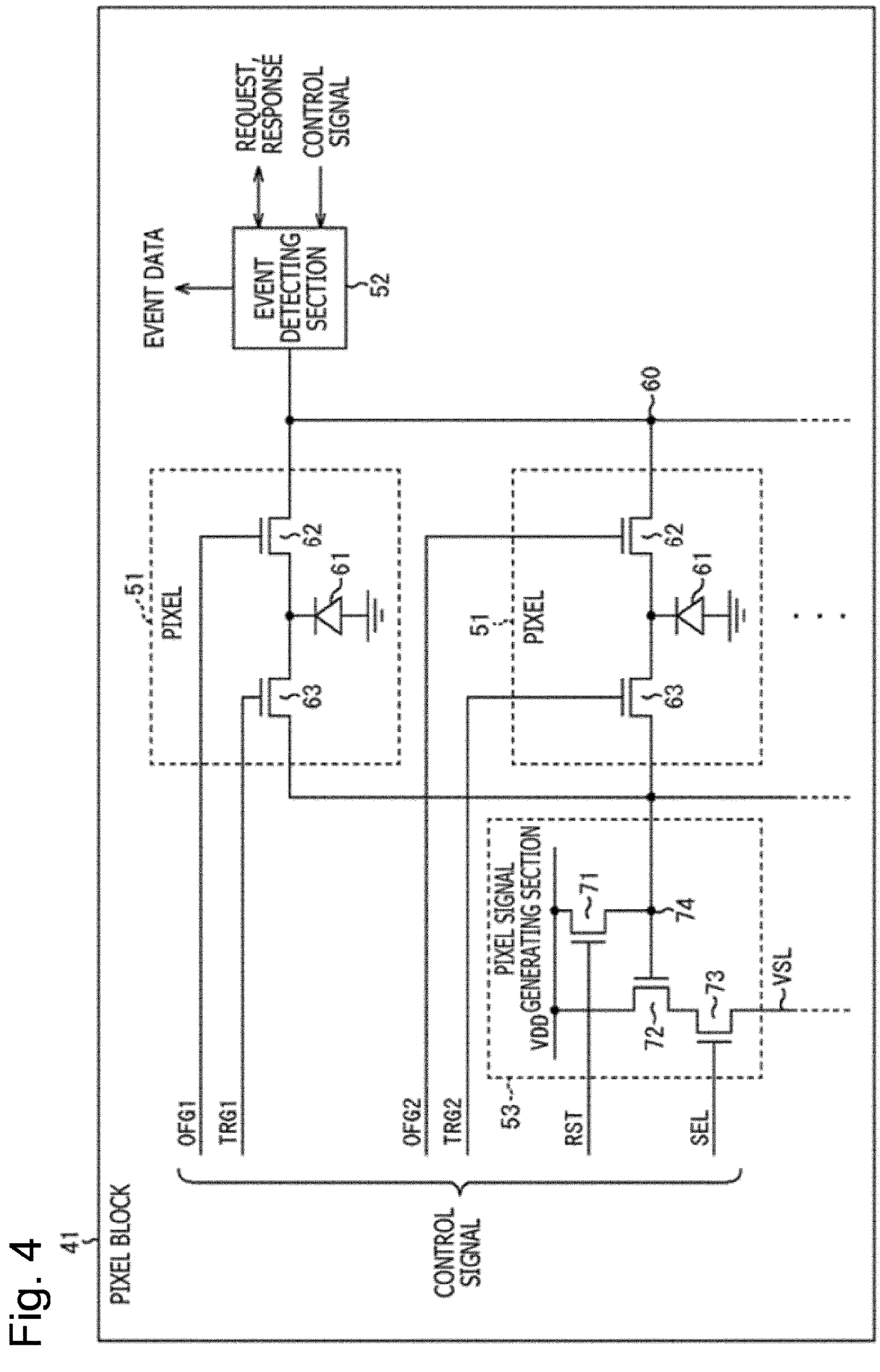
FIG. 4 is a schematic circuit diagram of a pixel block.

FIG. 4 is a circuit diagram illustrating a configuration example of the pixel block 41.

The pixel block 41 includes, as described with reference to FIG. 3, the pixels 51, the event detecting section 52, and the pixel signal generating section 53.

The pixel 51 includes a photoelectric conversion element 61 and transfer transistors 62 and 63.

The photoelectric conversion element 61 includes, for example, a PD (Photodiode). The photoelectric conversion element 61 receives incident light and performs photoelectric conversion to generate charges.

The transfer transistor 62 includes, for example, an N (Negative)-type MOS (Metal-Oxide-Semiconductor) FET (Field Effect Transistor). The transfer transistor 62 of the n-th pixel 51 of the I×J pixels 51 in the pixel block 41 is turned on or off in response to a control signal OFGn supplied from the driving section 32 (FIG. 2). When the transfer transistor 62 is turned on, charges generated in the photoelectric conversion element 61 are transferred (supplied) to the event detecting section 52, as a photocurrent.

The transfer transistor 63 includes, for example, an N-type MOSFET. The transfer transistor 63 of the n-th pixel 51 of the I×J pixels 51 in the pixel block 41 is turned on or off in response to a control signal TRGn supplied from the driving section 32. When the transfer transistor 63 is turned on, charges generated in the photoelectric conversion element 61 are transferred to an FD 74 of the pixel signal generating section 53.

The I×J pixels 51 in the pixel block 41 are connected to the event detecting section 52 of the pixel block 41 through nodes 60. Thus, photocurrents generated in (the photoelectric conversion elements 61 of) the pixels 51 are supplied to the event detecting section 52 through the nodes 60. As a result, the event detecting section 52 receives the sum of photocurrents from all the pixels 51 in the pixel block 41. Thus, the event detecting section 52 detects, as an event, a change in sum of photocurrents supplied from the I×J pixels 51 in the pixel block 41.

The pixel signal generating section 53 includes a reset transistor 71, an amplification transistor 72, a selection transistor 73, and the FD (Floating Diffusion) 74.

The reset transistor 71, the amplification transistor 72, and the selection transistor 73 include, for example, N-type MOSFETs.

The reset transistor 71 is turned on or off in response to a control signal RST supplied from the driving section 32 (FIG. 2). When the reset transistor 71 is turned on, the FD 74 is connected to a power supply VDD, and charges accumulated in the FD 74 are thus discharged to the power supply VDD. With this, the FD 74 is reset.

The amplification transistor 72 has a gate connected to the FD 74, a drain connected to the power supply VDD, and a source connected to the VSL through the selection transistor 73. The amplification transistor 72 is a source follower and outputs a voltage (electrical signal) corresponding to the voltage of the FD 74 supplied to the gate to the VSL through the selection transistor 73.

The selection transistor 73 is turned on or off in response to a control signal SEL supplied from the driving section 32. When the selection transistor 73 is turned on, a voltage corresponding to the voltage of the FD 74 from the amplification transistor 72 is output to the VSL.

The FD 74 accumulates charges transferred from the photoelectric conversion elements 61 of the pixels 51 through the transfer transistors 63, and converts the charges to voltages.

With regard to the pixels 51 and the pixel signal generating section 53, which are configured as described above, the driving section 32 turns on the transfer transistors 62 with control signals OFGn, so that the transfer transistors 62 supply, to the event detecting section 52, photocurrents based on charges generated in the photoelectric conversion elements 61 of the pixels 51. With this, the event detecting section 52 receives a current that is the sum of the photocurrents from all the pixels 51 in the pixel block 41, which might also be only a single pixel.

When the event detecting section 52 detects, as an event, a change in photocurrent (sum of photocurrents) in the pixel block 41, the driving section 32 turns off the transfer transistors 62 of all the pixels 51 in the pixel block 41, to thereby stop the supply of the photocurrents to the event detecting section 52. Then, the driving section 32 sequentially turns on, with the control signals TRGn, the transfer transistors 63 of the pixels 51 in the pixel block 41 in which the event has been detected, so that the transfer transistors 63 transfers charges generated in the photoelectric conversion elements 61 to the FD 74. The FD 74 accumulates the charges transferred from (the photoelectric conversion elements 61 of) the pixels 51. Voltages corresponding to the charges accumulated in the FD 74 are output to the VSL, as pixel signals of the pixels 51, through the amplification transistor 72 and the selection transistor 73.

As described above, in the sensor section 21 (FIG. 2), only pixel signals of the pixels 51 in the pixel block 41 in which an event has been detected are sequentially output to the VSL. The pixel signals output to the VSL are supplied to the AD conversion section 34 to be subjected to AD conversion.

Here, in the pixels 51 in the pixel block 41, the transfer transistors 63 can be turned on not sequentially but simultaneously. In this case, the sum of pixel signals of all the pixels 51 in the pixel block 41 can be output.

In the pixel array section 31 of FIG. 3, the pixel block 41 includes one or more pixels 51, and the one or more pixels 51 share the event detecting section 52 and the pixel signal generating section 53. Thus, in the case where the pixel block 41 includes a plurality of pixels 51, the numbers of the event detecting sections 52 and the pixel signal generating sections 53 can be reduced as compared to a case where the event detecting section 52 and the pixel signal generating section 53 are provided for each of the pixels 51, with the result that the scale of the pixel array section 31 can be reduced.

Note that, in the case where the pixel block 41 includes a plurality of pixels 51, the event detecting section 52 can be provided for each of the pixels 51. In the case where the plurality of pixels 51 in the pixel block 41 share the event detecting section 52, events are detected in units of the pixel blocks 41. In the case where the event detecting section 52 is provided for each of the pixels 51, however, events can be detected in units of the pixels 51.

Yet, even in the case where the plurality of pixels 51 in the pixel block 41 share the single event detecting section 52, events can be detected in units of the pixels 51 when the transfer transistors 62 of the plurality of pixels 51 are temporarily turned on in a time-division manner.

Further, in a case where there is no need to output pixel signals, the pixel block 41 can be formed without the pixel signal generating section 53. In the case where the pixel block 41 is formed without the pixel signal generating section 53, the sensor section 21 can be formed without the AD conversion section 34 and the transfer transistors 63. In this case, the scale of the sensor section 21 can be reduced. The sensor will then output the address of the pixel (block) in which the event occurred, if necessary with a time stamp.

Figure 5:
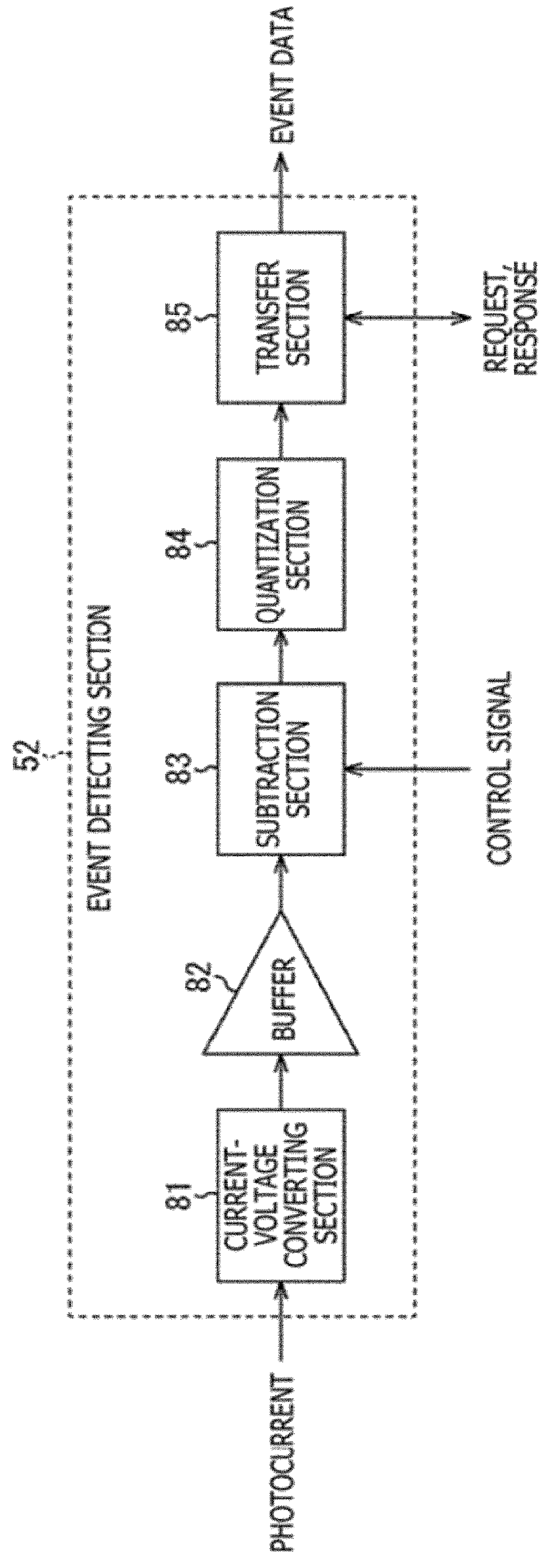
FIG. 5 is a schematic block diagram illustrating of an event detecting section.

FIG. 5 is a block diagram illustrating a configuration example of the event detecting section 52 of FIG. 3.

The event detecting section 52 includes a current-voltage converting section 81, a buffer 82, a subtraction section 83, a quantization section 84, and a transfer section 85.

The current-voltage converting section 81 converts (a sum of) photocurrents from the pixels 51 to voltages corresponding to the logarithms of the photocurrents (hereinafter also referred to as a "photovoltage") and supplies the voltages to the buffer 82.

The buffer 82 buffers photovoltages from the current-voltage converting section 81 and supplies the resultant to the subtraction section 83.

The subtraction section 83 calculates, at a timing instructed by a row driving signal that is a control signal from the driving section 32, a difference between the current photovoltage and a photovoltage at a timing slightly shifted from the current time, and supplies a difference signal corresponding to the difference to the quantization section 84.

The quantization section 84 quantizes difference signals from the subtraction section 83 to digital signals and supplies the quantized values of the difference signals to the transfer section 85 as event data.

The transfer section 85 transfers (outputs), on the basis of event data from the quantization section 84, the event data to the output section 35. That is, the transfer section 85 supplies a request for requesting the output of the event data to the arbiter 33. Then, when receiving a response indicating event data output permission to the request from the arbiter 33, the transfer section 85 outputs the event data to the output section 35.

Event detection is basically performed by calculating differences of photovoltages at different points in time and by comparing these differences to an event detection threshold. These steps are performed by the subtraction section 83 and the quantization section 84. These sections can therefore be considered to form an event detection unit 20 within the event detecting section 52.

Figure 6:
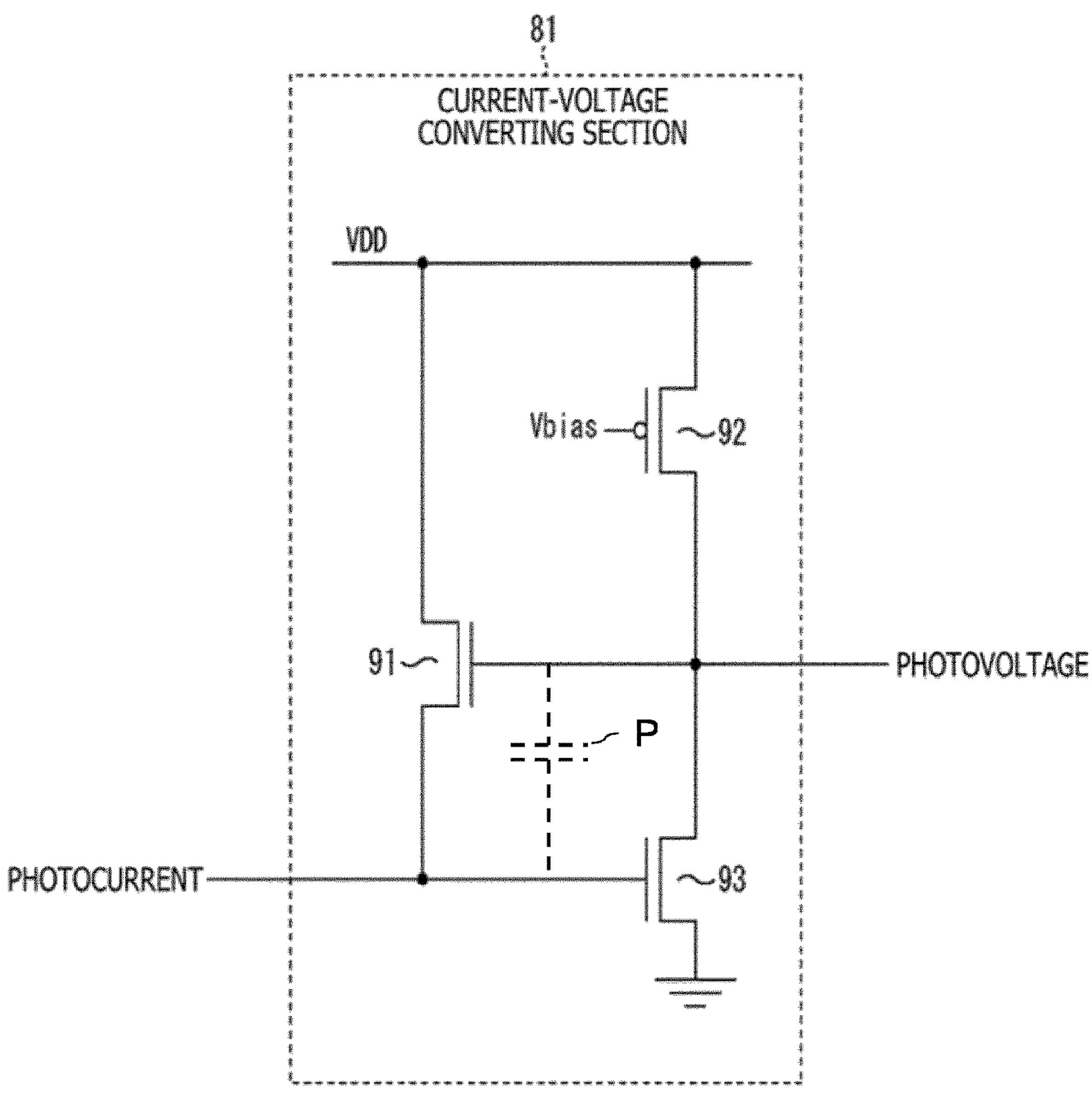
FIG. 6 is a schematic circuit diagram of a current-voltage converting section.

FIG. 6 is a circuit diagram illustrating a configuration example of the current-voltage converting section 81 of FIG. 5.

The current-voltage converting section 81 includes transistors 91 to 93. As the transistors 91 and 93, for example, N-type MOSFETs can be employed. As the transistor 92, for example, a P-type MOSFET can be employed.

The transistor 91 has a source connected to the gate of the transistor 93, and a photocurrent is supplied from the pixel 51 to the connecting point between the source of the transistor 91 and the gate of the transistor 93. The transistor 91 has a drain connected to the power supply voltage VDD and a gate connected to the drain of the transistor 93.

The transistor 92 has a source connected to the power supply voltage VDD and a drain connected to the connecting point between the gate of the transistor 91 and the drain of the transistor 93. A predetermined bias voltage Vbias is applied to the gate of the transistor 92. With the bias voltage Vbias, the transistor 92 is turned on or off, and the operation of the current-voltage converting section 81 is turned on or off depending on whether the transistor 92 is turned on or off.

The source of the transistor 93 is grounded.

In the current-voltage converting section 81, the transistor 91 has the drain connected on the power supply VDD side. The source of the transistor 91 is connected to the pixels 51 (FIG. 4), so that photocurrents based on charges generated in the photoelectric conversion elements 61 of the pixels 51 flow through the transistor 91 (from the drain to the source). The transistor 91 operates in a subthreshold region, and at the gate of the transistor 91, photovoltages corresponding to the logarithms of the photocurrents flowing through the transistor 91 are generated. As described above, in the current-voltage converting section 81, the transistor 91 converts photocurrents from the pixels 51 to photovoltages corresponding to the logarithms of the photocurrents.

In the current-voltage converting section 81, the transistor 91 has the gate connected to the connecting point between the drain of the transistor 92 and the drain of the transistor 93, and the photovoltages are output from the connecting point in question.

The signal to noise ratio of the current-voltage converting section 81 is in good approximation independent of the size of the photocurrent, but depends very much on a parasitic capacitor P between the input of the photocurrent and the output of the photovoltage. Since the signal to noise ratio of the photovoltage determines the sensitivity of the sensor device 10, the capacitance of the parasitic capacitor P should not be minimized. This, however, will in turn increase the latency of the current-voltage conversion, and hence of the pixel output. Thus, in designing the current-voltage converting section 81 there is a trade-off between sensitivity and latency that needs to be fixed by adjusting the parasitic capacitor. Here, it should be noted that due to the approximate independence of the signal to noise ratio from the size of the photocurrent the sensitivity cannot be increased by binning photocurrents.

It is to be understood that the current-voltage converting section 81 may also be constructed differently. For example, there can be more transistor stages. However, in all cases the signal to noise ratio of the photovoltage will not depend on the photocurrent, but on the design of the current-voltage converting section 81. Thus, although a binning of photocurrents, as e.g. applied in a situation in which one pixel block 41 comprises several pixels 51 and as described above with respect to FIG. 4 will reduce the latency of the system, it will not increase the signal to noise ratio of the photovoltage and hence also not the sensitivity of the system.

Figure 7:
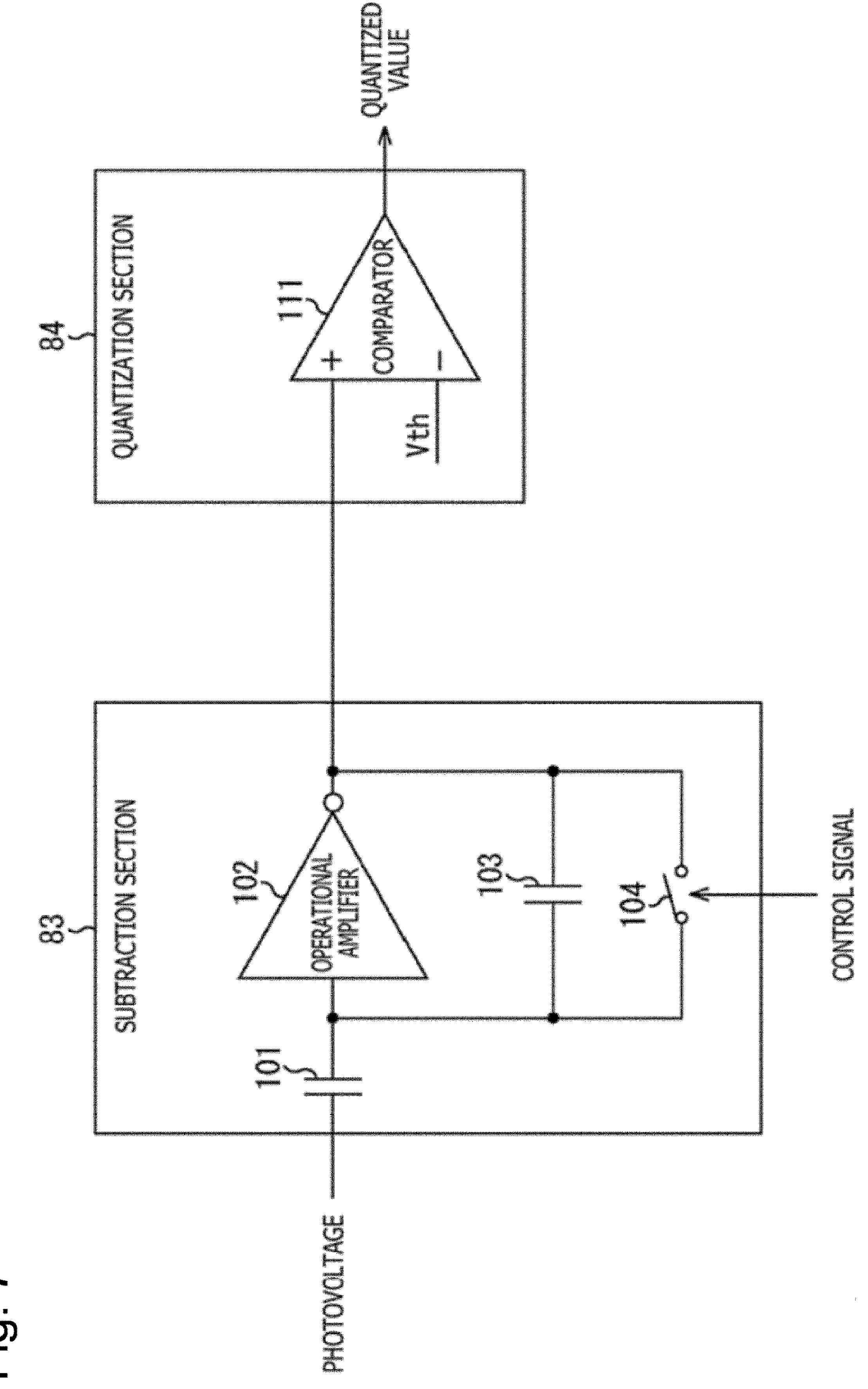
FIG. 7 is a schematic circuit diagram of a subtraction section and a quantization section.

FIG. 7 is a circuit diagram illustrating configuration examples of the subtraction section 83 and the quantization section 84 of FIG. 5.

The subtraction section 83 includes a capacitor 101, an amplifier 102, an optional capacitor 103, and a switch 104. The quantization section 84 includes a comparator 111.

The capacitor 101 has one end connected to the output terminal of the buffer 82 (FIG. 5) and the other end connected to the input terminal (inverting input terminal) of the amplifier 102. Thus, photovoltages are input to the input terminal of the amplifier 102 through the capacitor 101.

The amplifier 102 has an output terminal connected to the non-inverting input terminal (+) of the comparator 111.

The capacitor 103 has one end connected to the input terminal of the amplifier 102 and the other end connected to the output terminal of the amplifier 102.

The switch 104 is connected to the capacitor 103 to switch the connections between the ends of the capacitor 103. The switch 104 is turned on or off in response to a row driving signal that is a control signal from the driving section 32, to thereby switch the connections between the ends of the capacitor 103.

A photovoltage on the buffer 82 (FIG. 5) side of the capacitor 101 when the switch 104 is on is denoted by Vinit, and the capacitance (electrostatic capacitance) of the capacitor 101 is denoted by C1. The input terminal of the amplifier 102 serves as a virtual ground terminal, and a charge Qinit that is accumulated in the capacitor 101 in the case where the switch 104 is on is expressed by Expression (1).

$$Qinit = C1 \times V\,init \tag{1}$$

Further, in the case where the switch 104 is on, the connection between the ends of the capacitor 103 is cut (short-circuited), so that no charge is accumulated in the capacitor 103.

When a photovoltage on the buffer 82 (FIG. 5) side of the capacitor 101 in the case where the switch 104 has thereafter been turned off is denoted by Vafter, a charge Qafter that is accumulated in the capacitor 101 in the case where the switch 104 is off is expressed by Expression (2).

$$Qafter = C1 \times V after \tag{2}$$

When the capacitance of the capacitor 103 is denoted by C2 and the output voltage of the amplifier 102 is denoted by Vout, a charge Q2 that is accumulated in the capacitor 103 is expressed by Expression (3).

$$Q2 = -C2 \times V\,\mathrm{out} \tag{3}$$

Since the total amount of charges in the capacitors 101 and 103 does not change before and after the switch 104 is turned off, Expression (4) is established.

$$Qinit = Qafter + Q2 \tag{4}$$

When Expression (1) to Expression (3) are substituted for Expression (4), Expression (5) is obtained.

$$V\,\mathrm{out} = -(C1/C2) \times (V after - V init) \tag{5}$$

With Expression (5), the subtraction section 83 subtracts the photovoltage Vinit from the photovoltage Vafter, that is, calculates the difference signal (Vout) corresponding to a difference Vafter-Vinit between the photovoltages Vafter and Vinit. With Expression (5), the subtraction gain of the subtraction section 83 is C1/C2. Since the maximum gain is normally desired, C1 is preferably set to a large value and C2 is preferably set to a small value. Meanwhile, when C2 is too small, kTC noise increases, resulting in a risk of deteriorated noise characteristics. Thus, the capacitance C2 can only be reduced in a range that achieves acceptable noise. Further, since the pixel blocks 41 each have installed therein the event detecting section 52 including the subtraction section 83, the capacitances C1 and C2 have space constraints. In consideration of these matters, the values of the capacitances C1 and C2 are determined.

The comparator 111 compares a difference signal from the subtraction section 83 with a predetermined threshold (voltage) Vth (>0) applied to the inverting input terminal (−), thereby quantizing the difference signal. The comparator 111 outputs the quantized value obtained by the quantization to the transfer section 85 as event data.

For example, in a case where a difference signal is larger than the threshold Vth, the comparator 111 outputs an H (High) level indicating 1, as event data indicating the occurrence of an event. In a case where a difference signal is not larger than the threshold Vth, the comparator 111 outputs an L (Low) level indicating 0, as event data indicating that no event has occurred.

The transfer section 85 supplies a request to the arbiter 33 in a case where it is confirmed on the basis of event data from the quantization section 84 that a change in light amount that is an event has occurred, that is, in the case where the difference signal (Vout) is larger than the threshold Vth. When receiving a response indicating event data output permission, the transfer section 85 outputs the event data indicating the occurrence of the event (for example, H level) to the output section 35.

The output section 35 includes, in event data from the transfer section 85, location/address information regarding (the pixel block 41 including) the pixel 51 in which an event indicated by the event data has occurred and time point information indicating a time point at which the event has occurred, and further, as needed, the polarity of a change in light amount that is the event, i.e. whether the intensity did increase or decrease. The output section 35 outputs the event data.

As the data format of event data including location information regarding the pixel 51 in which an event has occurred, time point information indicating a time point at which the event has occurred, and the polarity of a change in light amount that is the event, for example, the data format called "AER (Address Event Representation)" can be employed.

Note that, a gain A of the entire event detecting section 52 is expressed by the following expression where the gain of the current-voltage converting section 81 is denoted by $CG_{log}$ and the gain of the buffer 82 is 1.

$$A = CG_{log} C1/C2(\Sigma i_{photo\_}n) \qquad (6)$$

Here, $i_{photo\_n}$ denotes a photocurrent of the n-th pixel 51 of the I×J pixels 51 in the pixel block 41. In Expression (6), Σ denotes the summation of n that takes integers ranging from 1 to I×J.

Note that, the pixel 51 can receive any light as incident light with an optical filter through which predetermined light passes, such as a color filter. For example, in a case where the pixel 51 receives visible light as incident light, event data indicates the occurrence of changes in pixel value in images including visible objects. Further, for example, in a case where the pixel 51 receives, as incident light, infrared light, millimeter waves, or the like for ranging, event data indicates the occurrence of changes in distances to objects. In addition, for example, in a case where the pixel 51 receives infrared light for temperature measurement, as incident light, event data indicates the occurrence of changes in temperature of objects. In the present embodiment, the pixel 51 is assumed to receive visible light as incident light.

Figure 8:
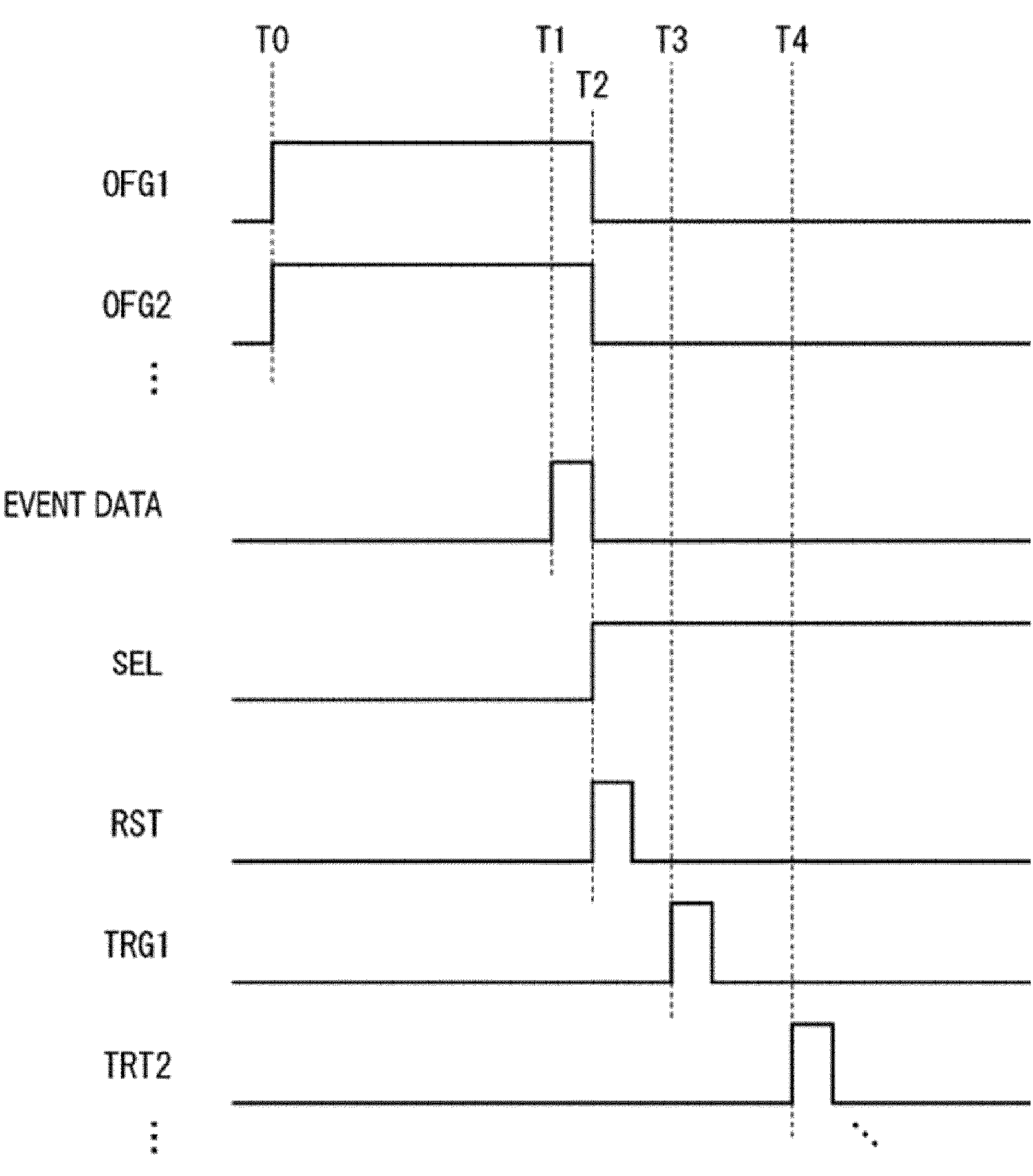
FIG. 8 is a schematic timing chart of an example operation of the sensor section.

FIG. 8 is a timing chart illustrating an example of the operation of the sensor section 21 of FIG. 2.

At Timing T0, the driving section 32 changes all the control signals OFGn from the L level to the H level, thereby turning on the transfer transistors 62 of all the pixels 51 in the pixel block 41. With this, the sum of photocurrents from all the pixels 51 in the pixel block 41 is supplied to the event detecting section 52. Here, the control signals TRGn are all at the L level and hence the transfer transistors 63 of all the pixels 51 are off.

For example, at Timing T1, when detecting an event, the event detecting section 52 outputs event data at the H level in response to the detection of the event.

At Timing T2, the driving section 32 sets all the control signals OFGn to the L level on the basis of the event data at the H level, to stop the supply of the photocurrents from the pixels 51 to the event detecting section 52. Further, the driving section 32 sets the control signal SEL to the H level, and sets the control signal RST to the H level over a certain period of time, to control the FD 74 to discharge the charges to the power supply VDD, thereby resetting the FD 74. The pixel signal generating section 53 outputs, as a reset level, a pixel signal corresponding to the voltage of the FD 74 when the FD 74 has been reset, and the AD conversion section 34 performs AD conversion on the reset level.

At Timing T3 after the reset level AD conversion, the driving section 32 sets a control signal TRG1 to the H level over a certain period to control the first pixel 51 in the pixel block 41 in which the event has been detected to transfer, to the FD 74, charges generated by photoelectric conversion in (the photoelectric conversion element 61 of) the first pixel 51. The pixel signal generating section 53 outputs, as a signal level, a pixel signal corresponding to the voltage of the FD 74 to which the charges have been transferred from the pixel 51, and the AD conversion section 34 performs AD conversion on the signal level.

The AD conversion section 34 outputs, to the output section 35, a difference between the signal level and the reset level obtained after the AD conversion, as a pixel signal serving as a pixel value of the image (frame data).

Here, the processing of obtaining a difference between a signal level and a reset level as a pixel signal serving as a pixel value of an image is called "CDS." CDS can be performed after the AD conversion of a signal level and a reset level, or can be simultaneously performed with the AD conversion of a signal level and a reset level in a case where the AD conversion section 34 performs single-slope AD conversion. In the latter case, AD conversion is performed on the signal level by using the AD conversion result of the reset level as an initial value.

At Timing T4 after the AD conversion of the pixel signal of the first pixel 51 in the pixel block 41, the driving section 32 sets a control signal TRG2 to the H level over a certain period of time to control the second pixel 51 in the pixel block 41 in which the event has been detected to output a pixel signal.

In the sensor section 21, similar processing is executed thereafter, so that pixel signals of the pixels 51 in the pixel block 41 in which the event has been detected are sequentially output.

When the pixel signals of all the pixels 51 in the pixel block 41 are output, the driving section 32 sets all the control signals OFGn to the H level to turn on the transfer transistors 62 of all the pixels 51 in the pixel block 41.

Figure 9:
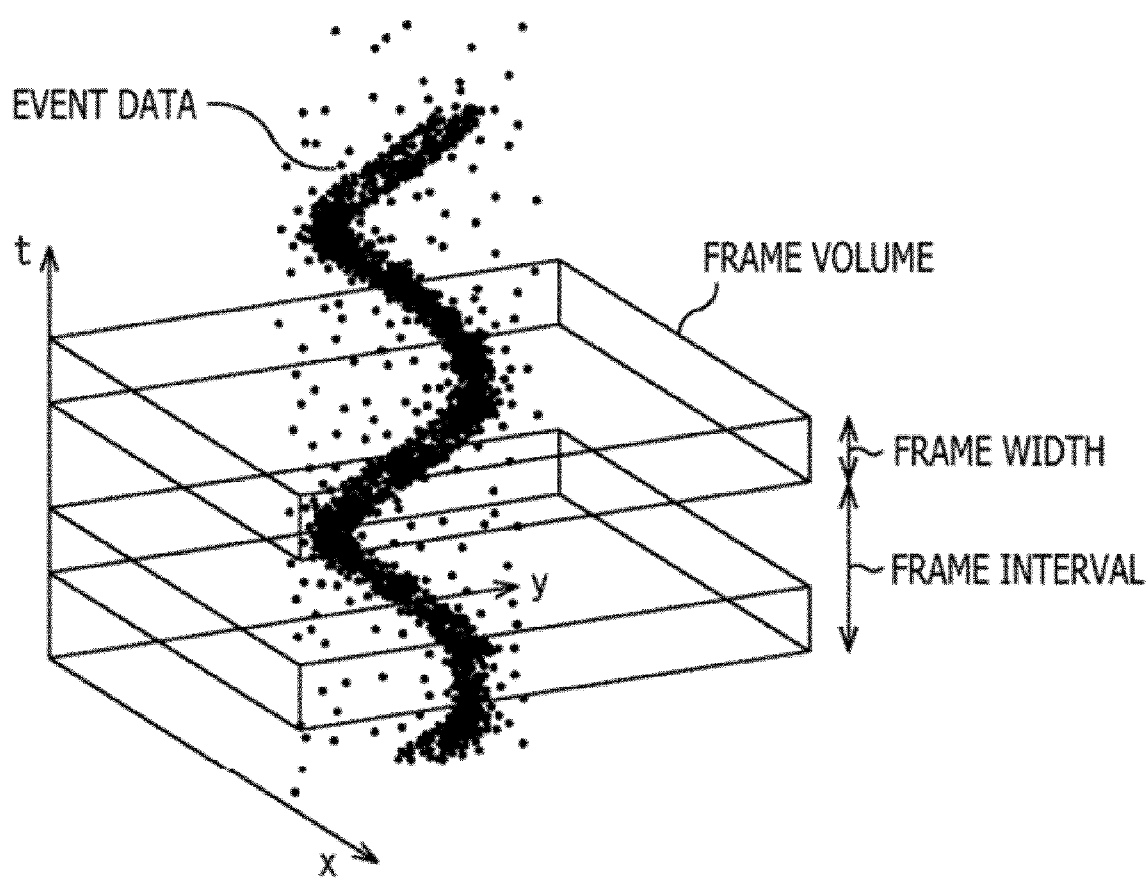
FIG. 9 is a schematic diagram of a frame data generation method based on event data.

FIG. 9 is a diagram illustrating an example of a frame data generation method based on event data.

The logic section 22 sets a frame interval and a frame width on the basis of an externally input command, for example. Here, the frame interval represents the interval of frames of frame data that is generated on the basis of event data. The frame width represents the time width of event data that is used for generating frame data on a single frame. A frame interval and a frame width that are set by the logic section 22 are also referred to as a "set frame interval" and a "set frame width," respectively.

The logic section 22 generates, on the basis of the set frame interval, the set frame width, and event data from the sensor section 21, frame data that is image data in a frame format, to thereby convert the event data to the frame data.

That is, the logic section 22 generates, in each set frame interval, frame data on the basis of event data in the set frame width from the beginning of the set frame interval.

Here, it is assumed that event data includes time point information ti indicating a time point at which an event has occurred (hereinafter also referred to as an "event time point") and coordinates (x, y) serving as location information regarding (the pixel block 41 including) the pixel 51 in which the event has occurred (hereinafter also referred to as an "event location").

In FIG. 9, in a three-dimensional space (time and space) with the x axis, the y axis, and the time axis t, points representing event data are plotted on the basis of the event time point t and the event location (coordinates) (x, y) included in the event data.

That is, when a location (x, y, t) on the three-dimensional space indicated by the event time point t and the event location (x, y) included in event data is regarded as the space-time location of an event, in FIG. 9, the points representing the event data are plotted on the space-time locations (x, y, t) of the events.

The logic section 22 starts to generate frame data on the basis of event data by using, as a generation start time point at which frame data generation starts, a predetermined time point, for example, a time point at which frame data generation is externally instructed or a time point at which the sensor device 10 is powered on.

Here, cuboids each having the set frame width in the direction of the time axis t in the set frame intervals, which appear from the generation start time point, are referred to as a "frame volume." The size of the frame volume in the x-axis direction or the y-axis direction is equal to the number of the pixel blocks 41 or the pixels 51 in the x-axis direction or the y-axis direction, for example.

The logic section 22 generates, in each set frame interval, frame data on a single frame on the basis of event data in the frame volume having the set frame width from the beginning of the set frame interval.

Frame data can be generated by, for example, setting white to a pixel (pixel value) in a frame at the event location (x, y) included in event data and setting a predetermined color such as gray to pixels at other locations in the frame.

Besides, in a case where event data includes the polarity of a change in light amount that is an event, frame data can be generated in consideration of the polarity included in the event data. For example, white can be set to pixels in the case a positive polarity, while black can be set to pixels in the case of a negative polarity.

In addition, in the case where pixel signals of the pixels 51 are also output when event data is output as described with reference to FIG. 3 and FIG. 4, frame data can be generated on the basis of the event data by using the pixel signals of the pixels 51. That is, frame data can be generated by setting, in a frame, a pixel at the event location (x, y) (in a block corresponding to the pixel block 41) included in event data to a pixel signal of the pixel 51 at the location (x, y) and setting a predetermined color such as gray to pixels at other locations.

Note that, in the frame volume, there are a plurality of pieces of event data that are different in the event time point t but the same in the event location (x, y) in some cases. In this case, for example, event data at the latest or oldest event time point t can be prioritized. Further, in the case where event data includes polarities, the polarities of a plurality of pieces of event data that are different in the event time point t but the same in the event location (x, y) can be added together, and a pixel value based on the added value obtained by the addition can be set to a pixel at the event location (x, y).

Here, in a case where the frame width and the frame interval are the same, the frame volumes are adjacent to each other without any gap. Further, in a case where the frame interval is larger than the frame width, the frame volumes are arranged with gaps. In a case where the frame width is larger than the frame interval, the frame volumes are arranged to be partly overlapped with each other.

Figure 10:
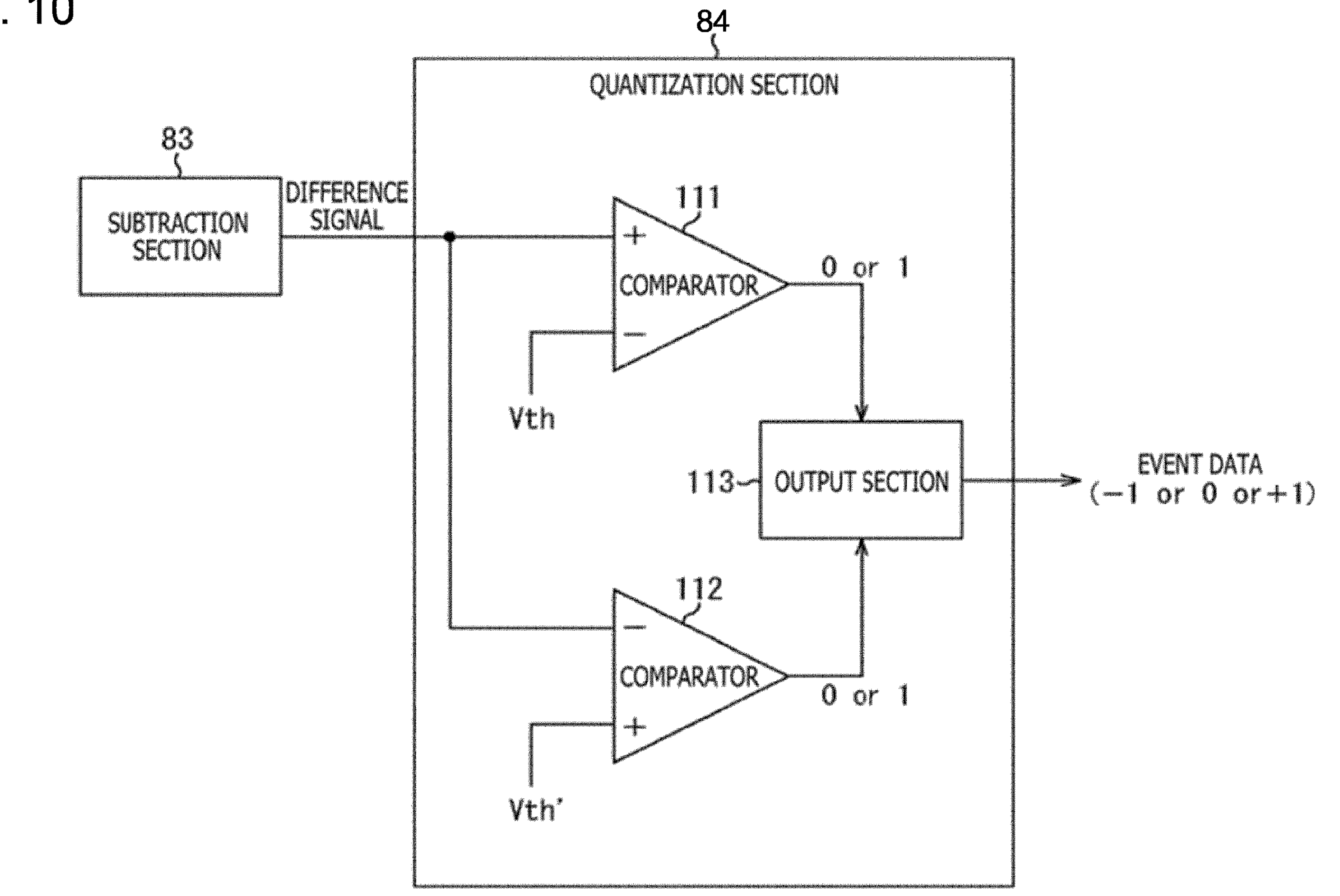
FIG. 10 is a schematic block diagram of another quantization section.

FIG. 10 is a block diagram illustrating another configuration example of the quantization section 84 of FIG. 5.

Note that, in FIG. 10, parts corresponding to those in the case of FIG. 7 are denoted by the same reference signs, and the description thereof is omitted as appropriate below.

In FIG. 10, the quantization section 84 includes comparators 111 and 112 and an output section 113.

Thus, the quantization section 84 of FIG. 10 is similar to the case of FIG. 7 in including the comparator 111. However, the quantization section 84 of FIG. 10 is different from the case of FIG. 7 in newly including the comparator 112 and the output section 113.

The event detecting section 52 (FIG. 5) including the quantization section 84 of FIG. 10 detects, in addition to events, the polarities of changes in light amount that are events.

In the quantization section 84 of FIG. 10, the comparator 111 outputs, in the case where a difference signal is larger than the threshold Vth, the H level indicating 1, as event data indicating the occurrence of an event having the positive polarity. The comparator 111 outputs, in the case where a difference signal is not larger than the threshold Vth, the L level indicating 0, as event data indicating that no event having the positive polarity has occurred.

Further, in the quantization section 84 of FIG. 10, a threshold Vth' (<Vth) is supplied to the non-inverting input terminal (+) of the comparator 112, and difference signals are supplied to the inverting input terminal (−) of the comparator 112 from the subtraction section 83. Here, for the sake of simple description, it is assumed that the threshold Vth' is equal to −Vth, for example, which needs however not to be the case.

The comparator 112 compares a difference signal from the subtraction section 83 with the threshold Vth' applied to the inverting input terminal (−), thereby quantizing the difference signal. The comparator 112 outputs, as event data, the quantized value obtained by the quantization.

For example, in a case where a difference signal is smaller than the threshold Vth' (the absolute value of the difference signal having a negative value is larger than the threshold Vth), the comparator 112 outputs the H level indicating 1, as event data indicating the occurrence of an event having the negative polarity. Further, in a case where a difference signal is not smaller than the threshold Vth' (the absolute value of the difference signal having a negative value is not larger than the threshold Vth), the comparator 112 outputs the L level indicating 0, as event data indicating that no event having the negative polarity has occurred.

The output section 113 outputs, on the basis of event data output from the comparators 111 and 112, event data indicating the occurrence of an event having the positive polarity, event data indicating the occurrence of an event having the negative polarity, or event data indicating that no event has occurred to the transfer section 85.

For example, the output section 113 outputs, in a case where event data from the comparator 111 is the H level indicating 1, +V volts indicating +1, as event data indicating the occurrence of an event having the positive polarity, to the transfer section 85. Further, the output section 113 outputs, in a case where event data from the comparator 112 is the H level indicating 1, −V volts indicating −1, as event data indicating the occurrence of an event having the negative polarity, to the transfer section 85. In addition, the output section 113 outputs, in a case where each event data from the comparators 111 and 112 is the L level indicating 0, 0 volts (GND level) indicating 0, as event data indicating that no event has occurred, to the transfer section 85.

The transfer section 85 supplies a request to the arbiter 33 in the case where it is confirmed on the basis of event data from the output section 113 of the quantization section 84 that a change in light amount that is an event having the positive polarity or the negative polarity has occurred. After receiving a response indicating event data output permission, the transfer section 85 outputs event data indicating the occurrence of the event having the positive polarity or the negative polarity (+V volts indicating 1 or −V volts indicating −1) to the output section 35.

Preferably, the quantization section 84 has a configuration as illustrated in FIG. 10.

Figure 11:
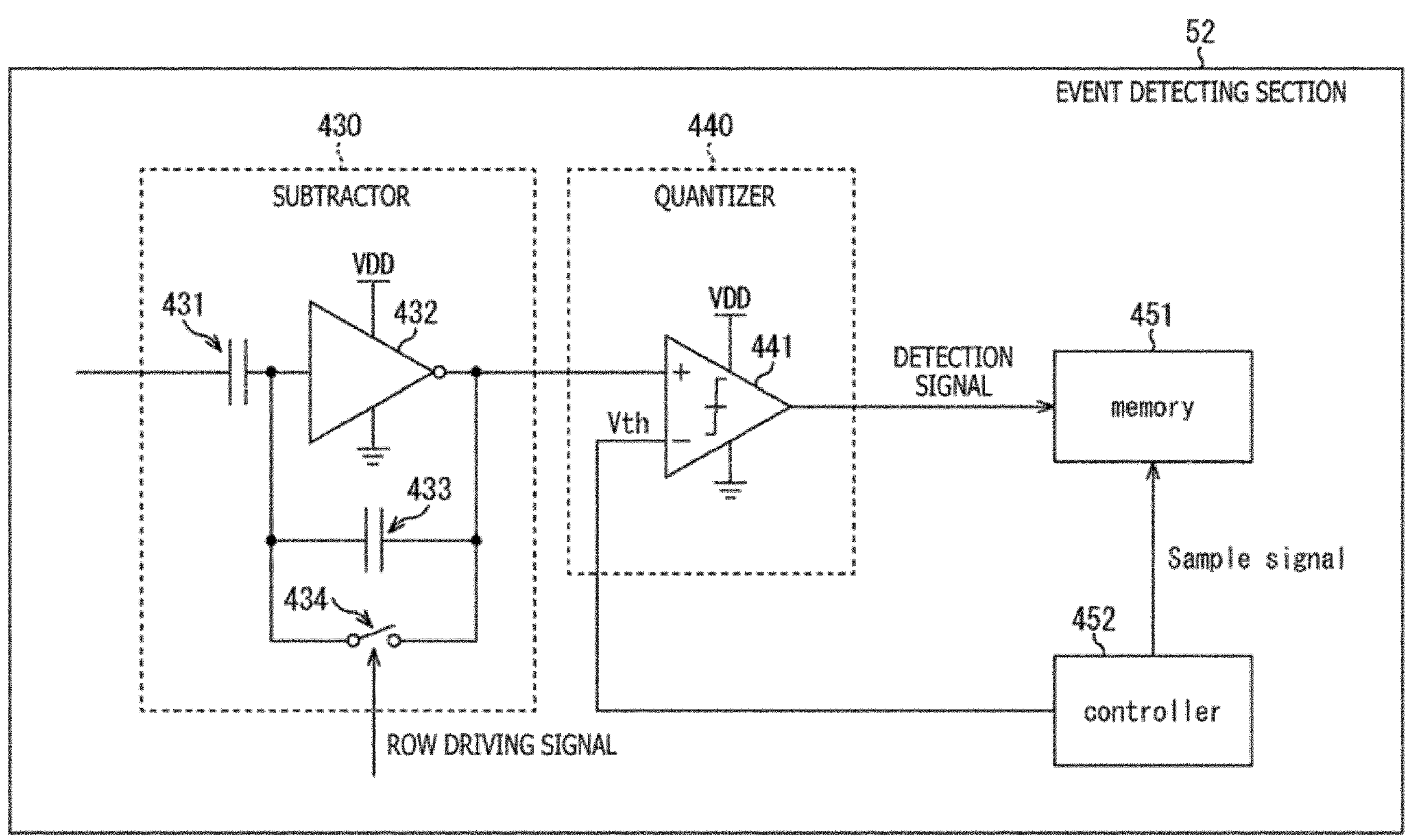
FIG. 11 is a schematic diagram of another event detecting section.

FIG. 11 is a diagram illustrating another configuration example of the event detecting section 52.

In FIG. 11, the event detecting section 52 includes a subtractor 430, a quantizer 440, a memory 451, and a controller 452. The subtractor 430 and the quantizer 440 correspond to the subtraction section 83 and the quantization section 84, respectively.

Note that, in FIG. 11, the event detecting section 52 further includes blocks corresponding to the current-voltage converting section 81 and the buffer 82, but the illustrations of the blocks are omitted in FIG. 11.

The subtractor 430 includes a capacitor 431, an amplifier 432, a capacitor 433, and a switch 434. The capacitor 431, the amplifier 432, the capacitor 433, and the switch 434 correspond to the capacitor 101, the amplifier 102, the capacitor 103, and the switch 104, respectively.

The quantizer 440 includes a comparator 441. The comparator 441 corresponds to the comparator 111.

The comparator 441 compares a voltage signal (difference signal) from the subtractor 430 with the predetermined threshold voltage Vth applied to the inverting input terminal (−). The comparator 441 outputs a signal indicating the comparison result, as a detection signal (quantized value).

The voltage signal from the subtractor 430 may be input to the input terminal (−) of the comparator 441, and the predetermined threshold voltage Vth may be input to the input terminal (+) of the comparator 441.

The controller 452 supplies the predetermined threshold voltage Vth applied to the inverting input terminal (−) of the comparator 441. The threshold voltage Vth which is supplied may be changed in a time-division manner. For example, the controller 452 supplies a threshold voltage Vth1 corresponding to ON events (for example, positive changes in photocurrent) and a threshold voltage Vth2 corresponding to OFF events (for example, negative changes in photocurrent) at different timings to allow the single comparator to detect a plurality of types of address events (events).

The memory 451 accumulates output from the comparator 441 on the basis of Sample signals supplied from the controller 452. The memory 451 may be a sampling circuit, such as a switch, plastic, or capacitor, or a digital memory circuit, such as a latch or flip-flop. For example, the memory 451 may hold, in a period in which the threshold voltage Vth2 corresponding to OFF events is supplied to the inverting input terminal (−) of the comparator 441, the result of comparison by the comparator 441 using the threshold voltage Vth1 corresponding to ON events. Note that, the memory 451 may be omitted, may be provided inside the pixel (pixel block 41), or may be provided outside the pixel.

Figure 12:
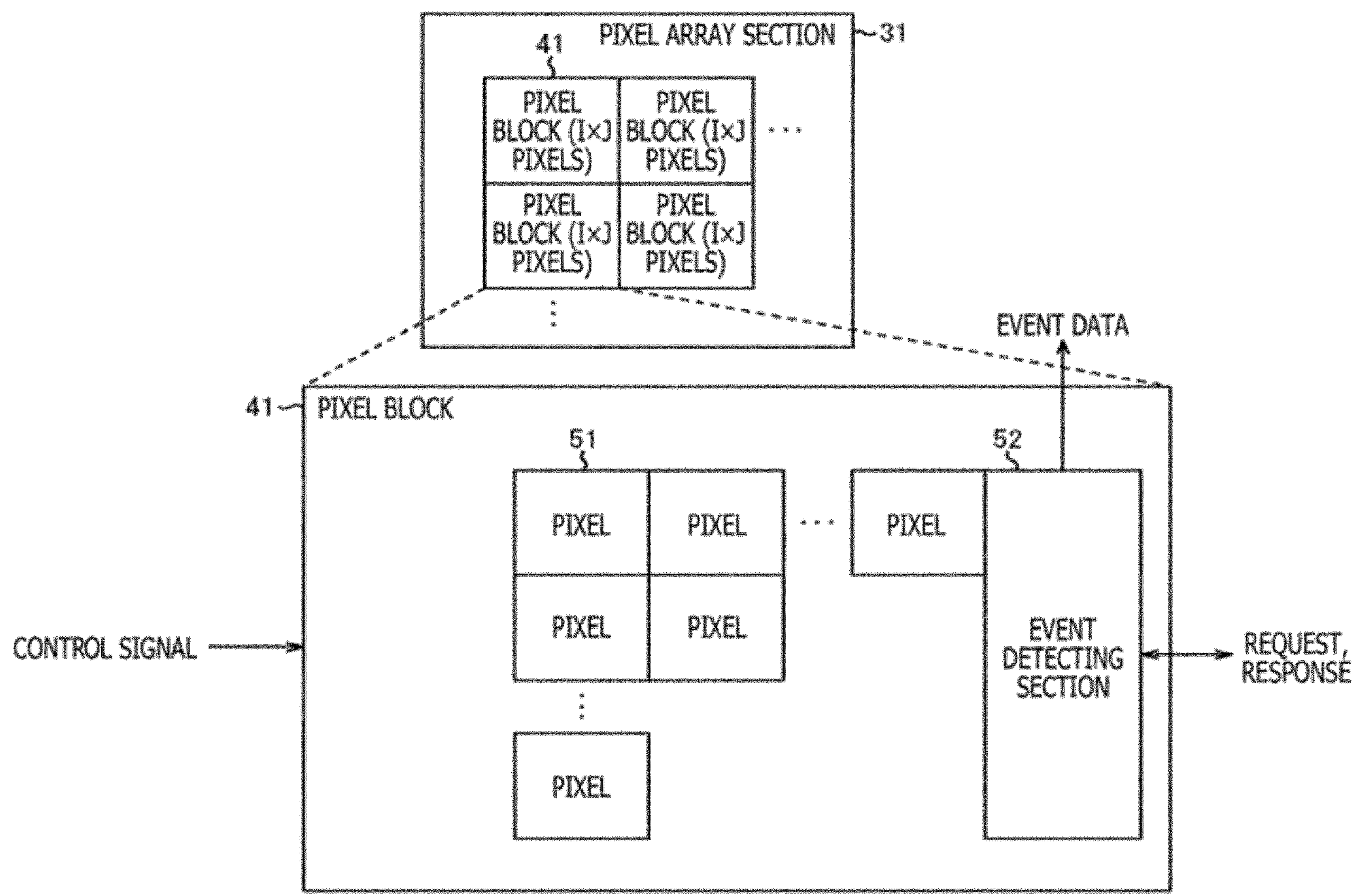
FIG. 12 is a schematic block diagram of another pixel array section.

FIG. 12 is a block diagram illustrating another configuration example of the pixel array section 31 of FIG. 2.

Note that, in FIG. 12, parts corresponding to those in the case of FIG. 3 are denoted by the same reference signs, and the description thereof is omitted as appropriate below.

In FIG. 12, the pixel array section 31 includes the plurality of pixel blocks 41. The pixel block 41 includes the I×J pixels 51 that are one or more pixels and the event detecting section 52.

Thus, the pixel array section 31 of FIG. 12 is similar to the case of FIG. 3 in that the pixel array section 31 includes the plurality of pixel blocks 41 and that the pixel block 41 includes one or more pixels 51 and the event detecting section 52. However, the pixel array section 31 of FIG. 12 is different from the case of FIG. 3 in that the pixel block 41 does not include the pixel signal generating section 53.

As described above, in the pixel array section 31 of FIG. 12, the pixel block 41 does not include the pixel signal generating section 53, so that the sensor section 21 (FIG. 2) can be formed without the AD conversion section 34.

Figure 13:
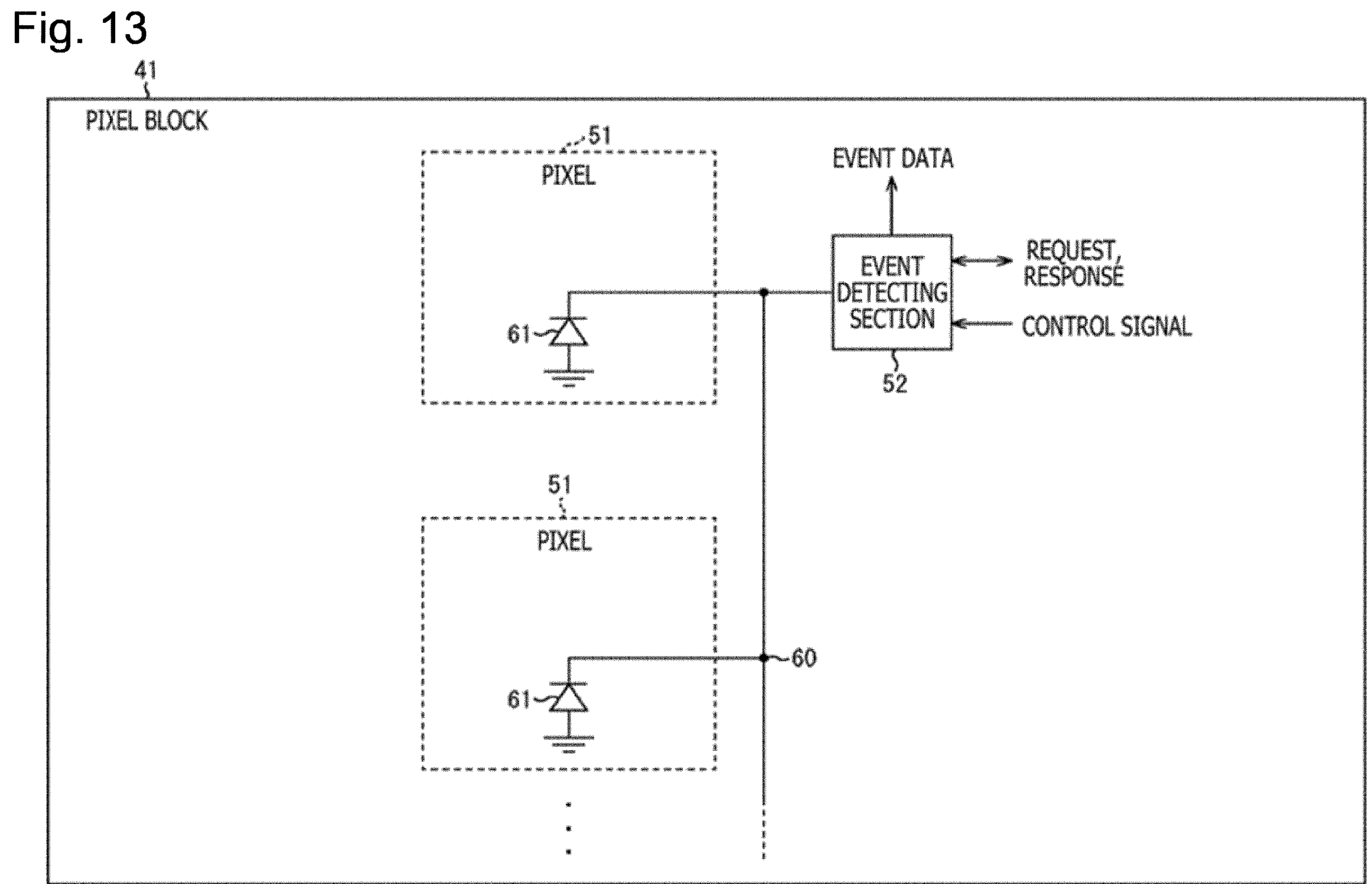
FIG. 13 is a schematic circuit diagram of another pixel block.

FIG. 13 is a circuit diagram illustrating a configuration example of the pixel block 41 of FIG. 12.

As described with reference to FIG. 12, the pixel block 41 includes the pixels 51 and the event detecting section 52, but does not include the pixel signal generating section 53.

In this case, the pixel 51 can only include the photoelectric conversion element 61 without the transfer transistors 62 and 63.

Note that, in the case where the pixel 51 has the configuration illustrated in FIG. 13, the event detecting section 52 can output a voltage corresponding to a photocurrent from the pixel 51, as a pixel signal.

Above, the sensor device 10 was described to be an asynchronous imaging device configured to read out events by the asynchronous readout system. However, the event readout system is not limited to the asynchronous readout system and may be the synchronous readout system. An imaging device to which the synchronous readout system is applied is a scan type imaging device that is the same as a general imaging device configured to perform imaging at a predetermined frame rate.

Figure 14:
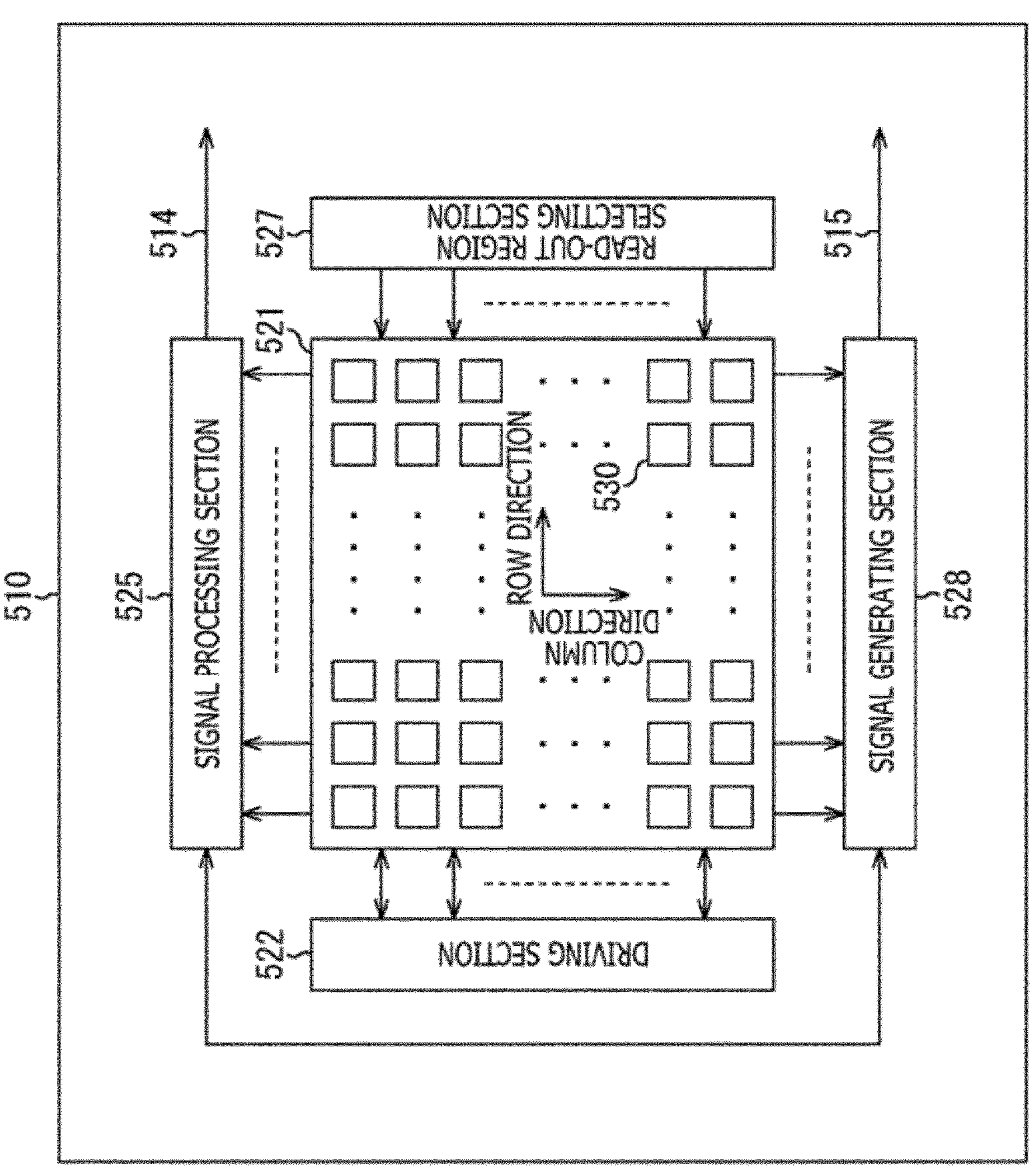
FIG. 14 is a schematic block diagram of a scan-type sensor device.

FIG. 14 is a block diagram illustrating a configuration example of a scan type imaging device.

As illustrated in FIG. 14, an imaging device 510 includes a pixel array section 521, a driving section 522, a signal processing section 525, a read-out region selecting section 527, and a signal generating section 528.

The pixel array section 521 includes a plurality of pixels 530. The plurality of pixels 530 each output an output signal in response to a selection signal from the read-out region selecting section 527. The plurality of pixels 530 can each include an in-pixel quantizer as illustrated in FIG. 11, for example. The plurality of pixels 530 output output signals corresponding to the amounts of change in light intensity. The plurality of pixels 530 may be two-dimensionally disposed in a matrix as illustrated in FIG. 14.

The driving section 522 drives the plurality of pixels 530, so that the pixels 530 output pixel signals generated in the pixels 530 to the signal processing section 525 through an output line 514. Note that, the driving section 522 and the signal processing section 525 are circuit sections for acquiring grayscale information. Thus, in a case where only event information (event data) is acquired, the driving section 522 and the signal processing section 525 may be omitted.

The read-out region selecting section 527 selects some of the plurality of pixels 530 included in the pixel array section 521. For example, the read-out region selecting section 527 selects one or a plurality of rows included in the two-dimensional matrix structure corresponding to the pixel array section 521. The read-out region selecting section 527 sequentially selects one or a plurality of rows on the basis of a cycle set in advance. Further, the read-out region selecting section 527 may determine a selection region on the basis of requests from the pixels 530 in the pixel array section 521.

The signal generating section 528 generates, on the basis of output signals of the pixels 530 selected by the read-out region selecting section 527, event signals corresponding to active pixels in which events have been detected of the selected pixels 530. The events mean an event that the intensity of light changes. The active pixels mean the pixel 530 in which the amount of change in light intensity corresponding to an output signal exceeds or falls below a threshold set in advance. For example, the signal generating section 528 compares output signals from the pixels 530 with a reference signal, and detects, as an active pixel, a pixel that outputs an output signal larger or smaller than the reference signal. The signal generating section 528 generates an event signal (event data) corresponding to the active pixel.

The signal generating section 528 can include, for example, a column selecting circuit configured to arbitrate signals input to the signal generating section 528. Further, the signal generating section 528 can output not only information regarding active pixels in which events have been detected, but also information regarding non-active pixels in which no event has been detected.

The signal generating section 528 outputs, through an output line 515, address information and optionally timestamp information (for example, (X, Y, T)) regarding the active pixels in which the events have been detected. However, the data that is output from the signal generating section 528 may not only be the address information and the timestamp information, but also information in a frame format (for example, (0, 0, 1, 0, . . . )).

In the above description photo currents generated in the pixels 51 are provided to event detection sections 52, where an electrical signal corresponding to the photo current is processed to decide whether or not the pixel 51 has seen an event, i.e. whether the received intensity has changed by more than a predetermined threshold.

However, although the signals of several pixels 51 may be binned and fed together into the event detection sections 52, this will not improve the sensitivity of the sensor device 10, which is basically fixed by the design of the current-voltage converting section 81. How to improve the sensitivity by an alternative binning approach will be described in the following. It should be noted here that for ease of description reference is only made to single pixels 51.

However, anything that is said for a single pixel can also be understood as a reference to a pixel block 41, in which signals of different pixels 51 are combined. Further, in the following any reference to a parallel APS system as shown in FIG. 4 will be omitted. The proposed binning will work independent of the presence of such a system, i.e. it will work in the context of FIG. 4 as well as in the APS-less context of FIG. 13.

Figure 15:
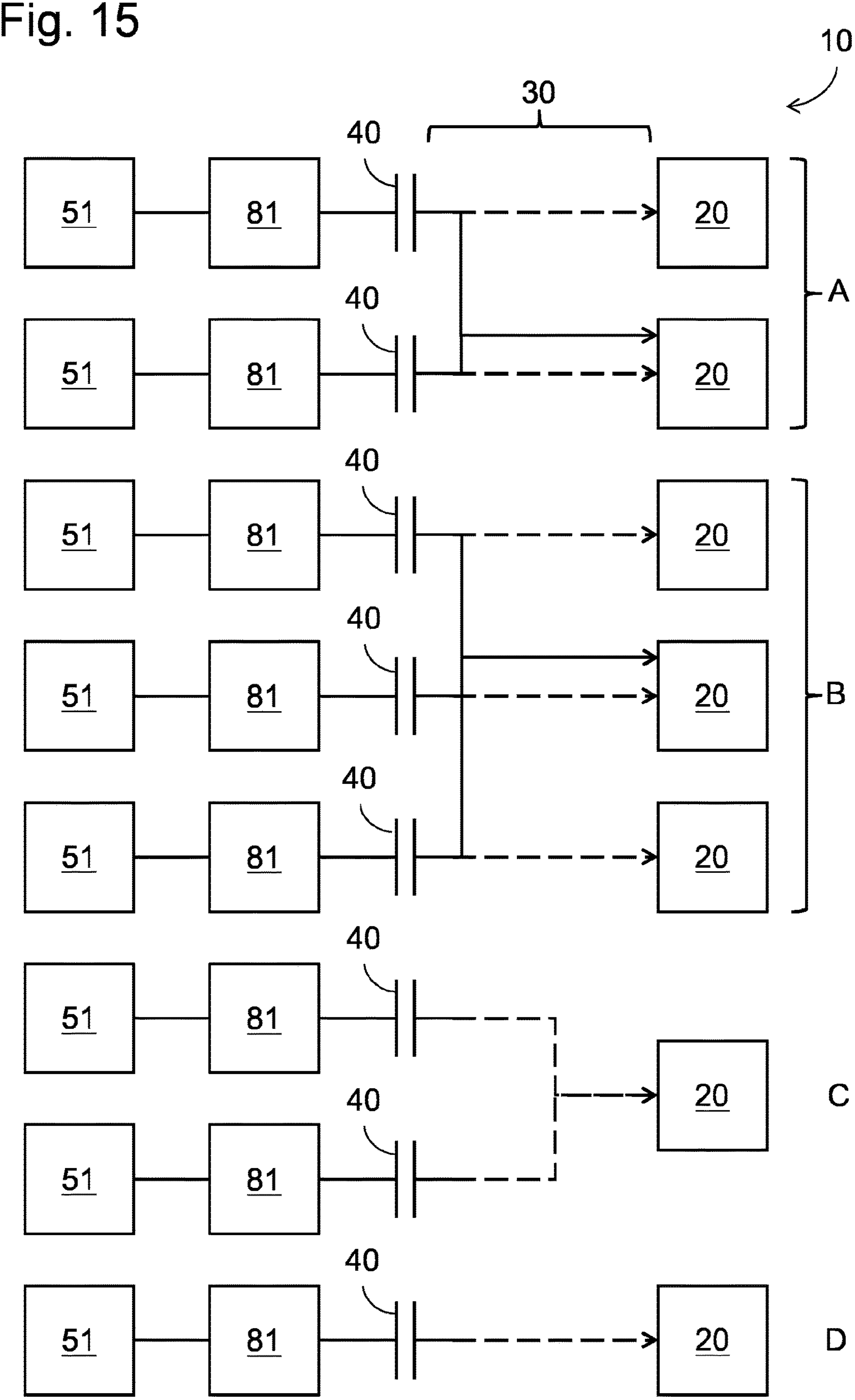
FIG. 15 is a schematic block diagram of photovoltage binning circuitry.

FIG. 15 shows a schematic diagram of a sensor device 10 in which the sensitivity can be increased due to photovoltage binning instead of photocurrent binning.

The sensor device 10 comprises a plurality of pixels 51 that are each configured to receive light and to perform photoelectric conversion to generate a photocurrent. The pixels 51 may be formed and arranged as described above. However, any pixel structure may be applied that provide a photocurrent based on light received by the pixel. Further, the pixels 51 may be arranged in any pattern. In particular, pixels 51 to be binned may be adjacent to each other, but may also be sparsely distributed within the plurality of pixels 51.

Each of the pixels 51 is connected to one of a plurality of current-voltage converting sections 81 that converts the photocurrent output from said one pixel 51 to a photovoltage. As stated above, "pixel" is to be understood as a reference to the output photocurrent. Thus, each of the pixels 51 of FIG. 15 may in fact be a pixel block 41 as described above with respect to FIGS. 3 and 4. But preferably, each pixel block 41 comprises only one pixel 51 such that there is a one-to-one correspondence between pixels 51 and current-voltage converting sections 81. The current-voltage converting sections 81 operate here according to the principles discussed above, i.e. they preferably output a photovoltage whose value depends logarithmically on the photocurrent, but whose signal to noise ratio depends only on the design of the voltage converting section 81.

To each of the current-voltage converting sections 81 one of a plurality of capacitors 40 is connected. Each capacitor 40 receives therefore the photovoltage output from its corresponding current-voltage converting section 81. The capacitors 40 may take over the roles of the capacitors 101, 431 in the subtraction section 83 that are arranged before the input of the amplifier 107, 432 as described above with respect to FIG. 7 or 11, i.e. they are the last electrical component before the amplifier 107, 432 of the subtraction section 83. But the capacitors 40 may also be provided additionally.

Via the one current-voltage converting section 81 provided to each pixel 51 there is formed a one-to-one association of capacitors 40 and pixels 51. If one understands a pixel 51 and its corresponding current-voltage converting section 81 as a single unit, e.g. as frontend of the sensor device 10 or as generalized form of pixel that outputs a photovoltage instead of a photocurrent, then for each such unit one capacitor 40 will receive the respective photovoltage. The pixels 51, the current-voltage converting sections 81 and the capacitors 40 may here be formed on a single wafer.

The photovoltages applied to the capacitors 40 are fed into a plurality of event detection units 20 that may e.g. be constituted by the subtraction section 83 and the quantization section 84 discussed above with respect to FIG. 5, 7, 10, or 11. Each of the event detection units 20 is configured to detect based on the photovoltages as an event whether a change in light intensity received by one or several pixels 51 is above a predetermined threshold. Here, the event detection units 20 may be part of a backend and may be arranged on a different wafer than the pixels 51/the frontend of the sensor device 10.

The event detection units 20 are connected via circuitry 30 with the capacitors 40. The circuitry 30 is configured to change the connection between a first state and a second state according to a first and a second operation mode of the sensor device 10. Changes of the connection may be effected by a controller providing control signals to various switches. The different states of the circuitry 30 are symbolized in FIG. 15 as dashed arrows (first state/operation mode) and solid arrows (second state/operation mode).

In the first operation mode at least one event detection unit 20 receives the photovoltage of only one pixel 51 via the corresponding capacitor 40, while in the second operation mode the at least one event detection unit 20 receives a combination of photovoltages from the one pixel 51 and at least another pixel 51 via the corresponding capacitors 40.

In the first operation mode the sensor device 10 is therefore enabled at its full resolution, since every event detection unit 20 receives its signal from as few pixels 51 as possible. On the other hand, in the second operation mode photovoltages of pixels 51 (as generated by the current-converting sections 81 and as transferred by the capacitors 40) are binned. Combining the voltages at the capacitor level will improve the root mean square noise at the following stages, i.e. the signal to noise ratio is improved, which would not be the case, if the photocurrents were combined directly. This allows using lower event thresholds without deteriorating the image capturing results by an excessive amount of events caused by noise.

Further, by transferring the generated voltages to the event detection logic via capacitors and by binning on the event detection logic side of the capacitors, less deterioration due to parasitic effects will occurs. In addition, the circuitry can be simplified considerably in comparison to cases in which binning at the current-voltage converting side is attempted, which usually comes with the introduction of one transistor per transistor in the current-voltage converting section 81.

The sensor device 10 therefore is able to operate without binning (first operation mode) and with binning (second operation mode). It is thus possible to adapt the sensitivity of the sensor device dynamically, although this comes at a loss of resolution.

As schematically illustrated in FIG. 15 the number of binned photovoltages may vary within the sensor device 10. FIG. 15 shows schematically the case (A) that in the second mode two photovoltages are combined and fed to one event detection unit 20, while in the first mode, each photovoltage is applied to a separate event detection unit 20. Just the same any other number of photovoltages may be combined. For example, FIG. 15 shows a case (B) in which three photovoltages are combined in the second mode which are treated separately in the first mode.

Further, it should be noted that the circuitry 30 does not necessarily change the connections between all pixels 51 and the corresponding event detection units 20. There can be several pixels whose photovoltages are always binned, as exemplified in FIG. 15 for two pixels 51 in case (C), for example in regions were a high sensitivity is more important than a high resolution. Also there can be pixels whose signals are never binned, such as the pixel 51 of case (D), for example in regions where a high resolution is more important than a high sensitivity.

Figure 16:
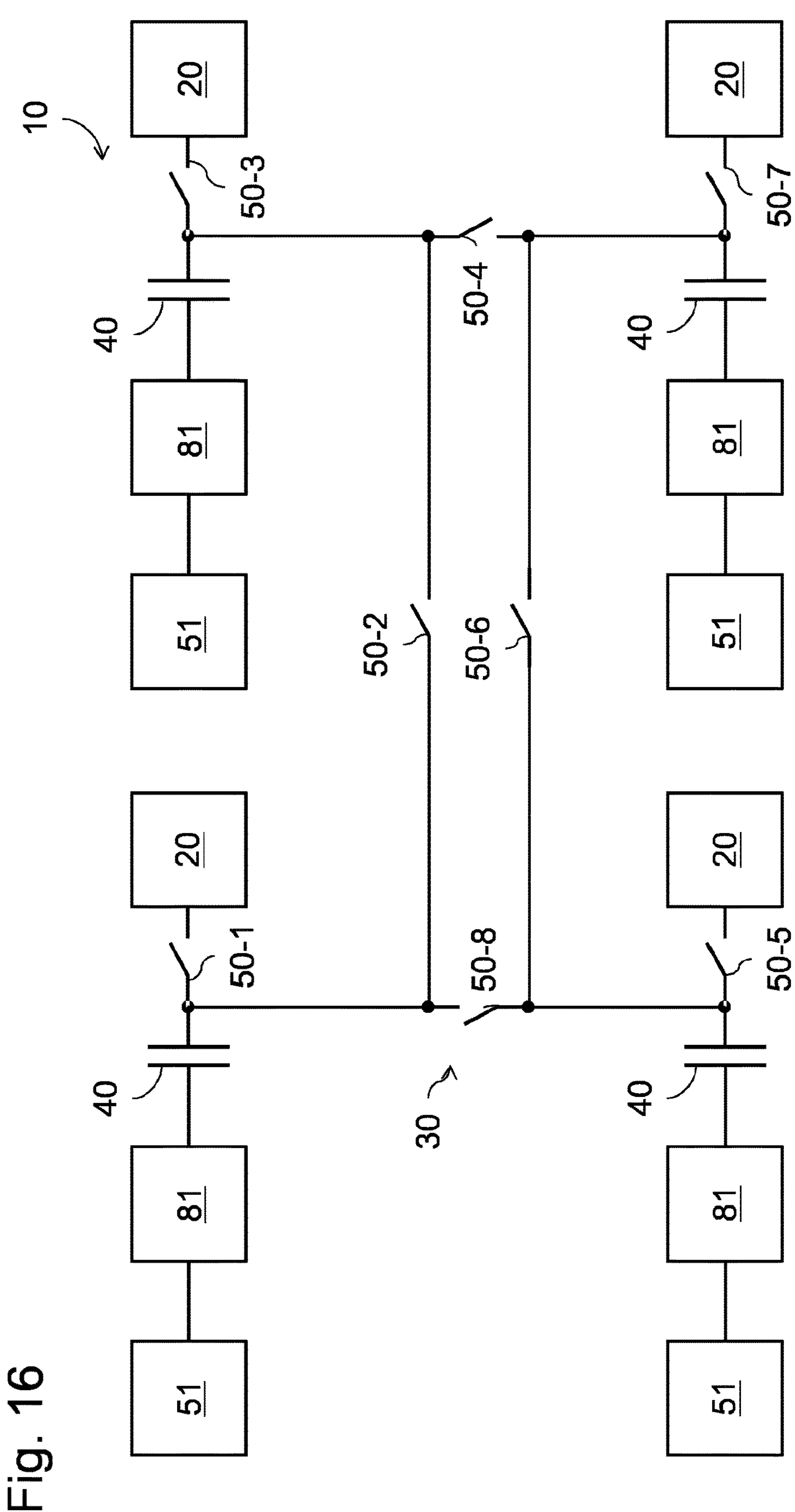
FIG. 16 is another schematic block diagram of photovoltage binning circuitry.

FIG. 16 shows schematically an example for a layout of the circuitry 30 that could be used to switch between the two operation modes.

FIG. 16 refers to a layout of the sensor device 10 where at least N pixels 51 correspond one-to-one to N event detection units 20, where N is a natural number larger than 1, e.g. 4 as shown in FIG. 16. All or only a part of the pixels 51 of the sensor device 10 may be divided into sets of N pixels 51 to be binned. Here, the circuitry 30 comprises switches 50, e.g. FET transistor switches, for connecting, in the first operation mode, each of the N capacitors 40 corresponding to the N pixels 51 one-to-one to the N event detection units 20, and for connecting, in the second operation mode, the N capacitors 40 corresponding to the N pixels 51 to each other and to at least one of the N event detection units 20.

As shown in FIG. 16 there are four first switches 50-1, 50-3, 50-5, 50-7 that can open and close a connection between a capacitor 40 and a corresponding event detection unit 20. Further, there are four second switches 50-2, 50-4, 50-6, 50-8 that can be used to connect the output sides of the capacitors 40 adjacent to each other. These switches can be used to switch between the first operation mode, i.e. the full resolution mode, and several second operation modes, i.e. binning modes.

In the first, full resolution mode, the first switches 50-1, 50-3, 50-5, 50-7 are closed/conducting, while the second switches 50-2, 50-4, 50-6, 50-8 are open/not conducting. In changing to 2×2 binning mode the second switches 50-2, 50-4, 50-6, 50-8 and one first switch 50-1 are closed, while the remaining first switches 50-3, 50-5, 50-7 are opened. Thus, in the first mode the photovoltage of one pixel 51 is transferred to one event detection unit 20. In the 2×2 binning mode the voltages of all capacitors 40 are combined by closing the second switches 50-2, 50-4, 50-6, 50-8. Further, by closing one of the first switches 50-1, but opening the other first switches 50-3, 50-5, 50-7, this combined signal is transferred to only one event detection unit 20.

Of course by opening the two left-right connecting switches 50-2, 50-6 or the two up-down connecting switches 50-4, 50-8, 2×1 and 1×2 binning can also be achieved as second operation mode, when at the same time respective event detection units 20 are connected to the capacitors 40. Further, by closing more than one of the first switches 50-1, 50-3, 50-5, 50-7 one can implement redundancy checks by carrying out event detection several times for the same, combined signal. Also, it is possible to run different event detection units 20 with different event detection thresholds, thus effectively evaluating the same, combined signal with different sensitivities.

Figure 17:
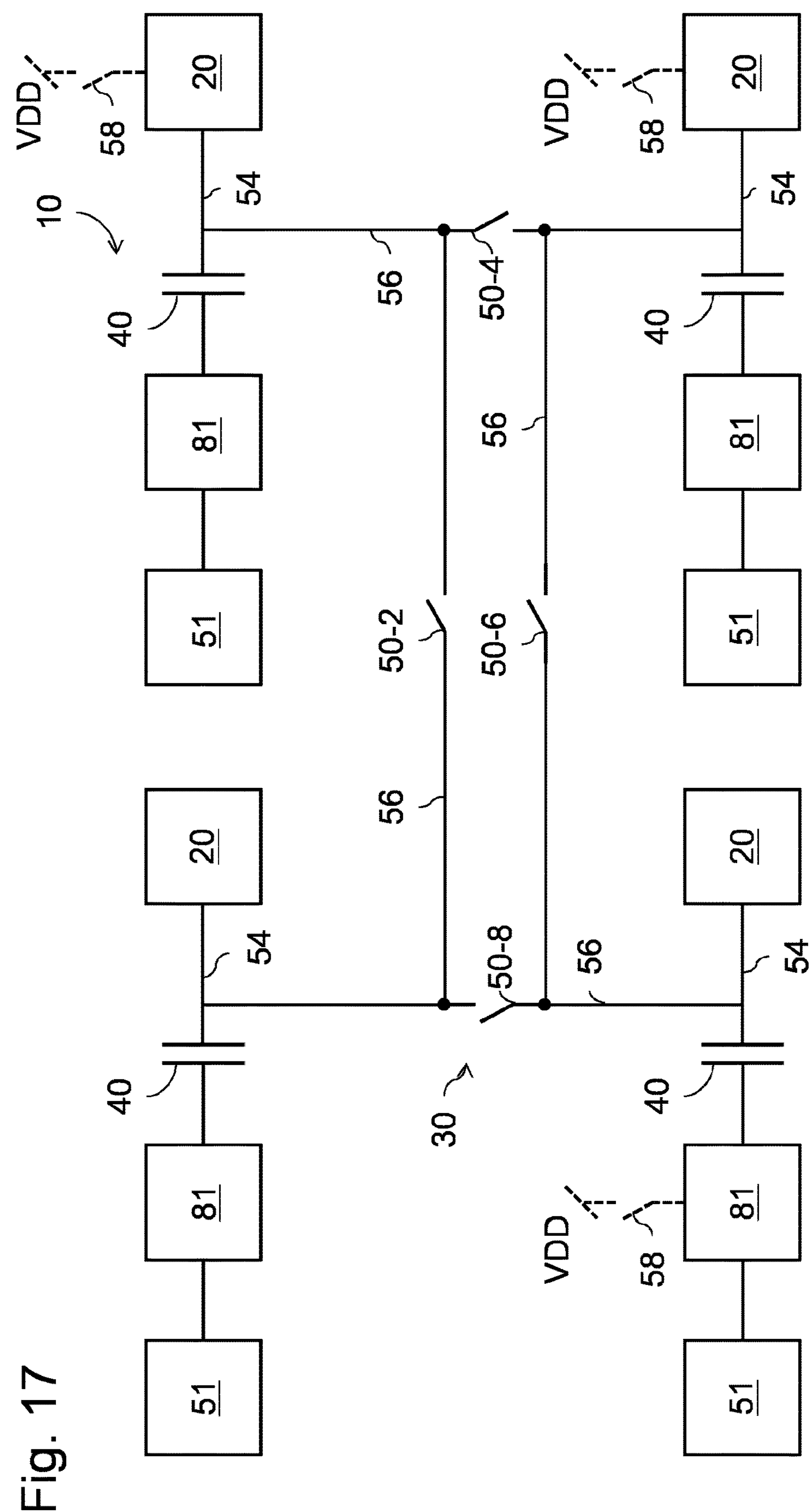
FIG. 17 is another schematic block diagram of photovoltage binning circuitry.

Here, it is also possible to omit the first switches 50-1, 50-3, 50-5, 50-7 altogether. An according adaption of the sensor device 10 of FIG. 16 is illustrated in FIG. 17.

Here, again at least N pixels 51 correspond one-to-one to N event detection units 20, where N is a natural number larger than 1. However, in contrast to FIG. 16 the circuitry 30 comprises non-switchable first connection lines 54 that connect the N capacitors 40 corresponding to the N pixels 51 one-to-one to the N event detection units 20, i.e. the first switches 50-1, 50-3, 50-5, 50-7 are not present.

Second connection lines 56 that connect the N capacitors 40 on the side of the event detection units 20 are maintained switchable. In the first operation mode, the second connection lines 56 are opened such that full resolution is available for the N pixels 51. In the second operation mode the second connection lines 56 will be closed.

Then, all event detection units 20 are in principle able to operate on the combined photovoltage signal. As explained above, in this configuration at least two of the N event detection units 20 may operate with different predetermined thresholds, in order to detect events with different sensitivities in the same signal. In this mode, if there is one event detected by one of the N event detection units 20 event detection by the N pixels 51 may be reset, i.e. the current combined light intensity value seen by the N pixels will be set as a new starting point for the monitoring of intensity changes.

Figure 18:
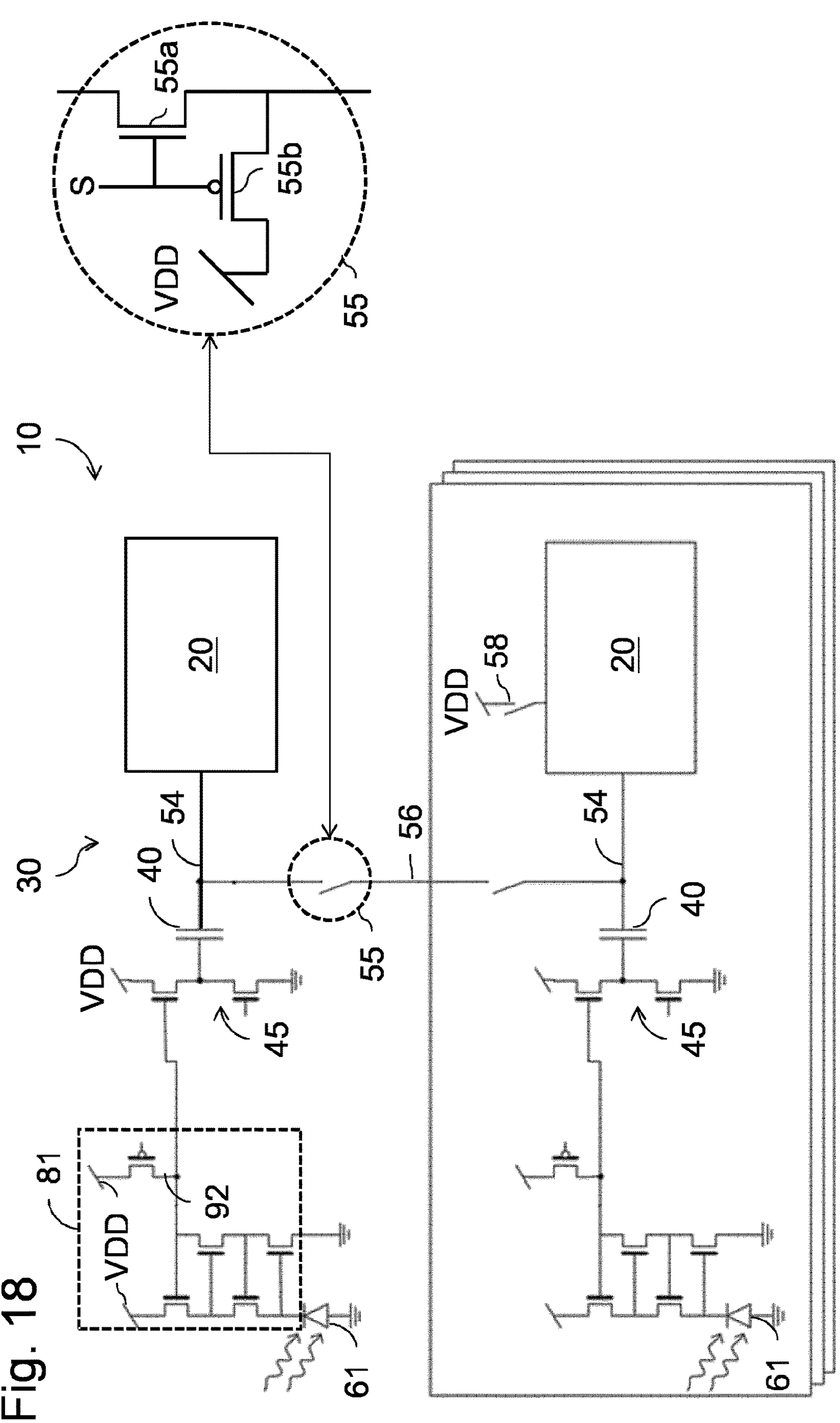
FIG. 18 is another schematic block diagram of photovoltage binning circuitry.

A possible implementation of such an arrangement is shown in FIG. 18. As can be seen in FIG. 18 the photocurrent generated by the photoelectric conversion element 61 of each pixel 51 is fed to a current-voltage converting section 81 containing four transistor stages in addition to the bias transistor 92.

Between the current-voltage converting section 81 and the capacitor 40 source follower circuit 45 may be provided that includes a bias current and a second transistor. The source follower may be built using two NMOS transistors or two PMOS transistors. The source follower circuit 45 may be used to isolate the current-voltage converting section 81 from voltage transients during pixel reset. It may also act as low-pass filter and will thus reduce the integrated noise. The source follower circuit 45 may also be omitted.

Between the capacitors 40 and the event detection units 20 the non-switchable first connection lines 54 are provided. Between the capacitors 40 of different pixels 51 the second connection lines 56 are provided. Here, as illustrated in FIG. 18 a switch for opening the second connection line may be associated with each capacitor 40.

Of these, at least one switch 55 is formed from an NMOS transistor 55*a* and a PMOS transistor 55*b*, wherein the NMOS transistor 55*a* has its source connected to one end of the second connection line 56 and its drain connected to the other end of the second connection line 56, the PMOS transistor 55*b* has its source connected to a supply voltage, VDD, of the sensor device 10 and its drain connected to the second connection line 56, and the gates of the NMOS transistor 55*a* and the PMOS transistor 55*b* are connected to each other and configured to receive the signal S for opening and closing the second connection line 56.

Once the second connection line 56 is disconnected via the NMOS transistor 55*a*, the PMOS transistor 55*b* pulls the second connection line 56 up to the supply voltage VDD. This reduces leakage currents in the NMOS transistor 55*a*. As shown in FIG. 18, it is sufficient if one such NMOS-PMOS switch 55 is present in a second connection line 56.

Further switches may be implemented as simple transistor switches, e.g. as NMOS transistors. Of course, the at least one switch 55 could also be implemented complementary, i.e. with a PMOS transistor connecting the capacitors and an NMOS transistor acting as pull-down.

Due to the non-switchable first connection lines 54 all event detection units 20 will receive the combined photovoltage signal. Then, it is possible to have a redundant event detection or an event detection with different thresholds/sensitivities at different event detection units 20.

Additionally or alternatively, the circuitry 30 may comprise switches 58 for switching off at least one and maximally (N−1) event detection units 20, e.g. by power-gating the event detection units 20. Thus, in this case it is either possible to adjust the redundancy of the system freely or to set the system to the state where only one event detection unit 20 is used to evaluate the combined photovoltage signal. Compared to the example using transistor switches to disconnect the connection between capacitors 40 and event detection units 20 switching off event detection units 20 has the advantage that the number of transistors connected to the still operating event detection unit 20 is reduced, which reduces in turn the occurrence of leakage currents.

Thus, using non-switchable first connection lines 54 and power gate switches 58 provides a comparably uncomplicated structure of the circuitry 30 that allows nevertheless full flexibility for the binning and the processing of the photovoltages of different pixels 51.

Further, it should be noted that providing the second connection lines 56 at the event detection unis side of the capacitors 40 also reduces the complexity of the circuitry 30. This is due to the fact that if one were to bin at the current-voltage converting section side, all transistors in the current-voltage converting sections 81 would need to be shortened. In the four transistor example shown in FIG. 18 this would lead to at least four additional transistor switches. In contrast, when binning after the capacitor 40, in principle only one transistor switch is needed, preferably in the form of the NMOS-PMOS switch 55 provided at the high impedance node of the at least one event detection unit 20 that is active during the second operation mode, i.e. during binning.

Figure 19:
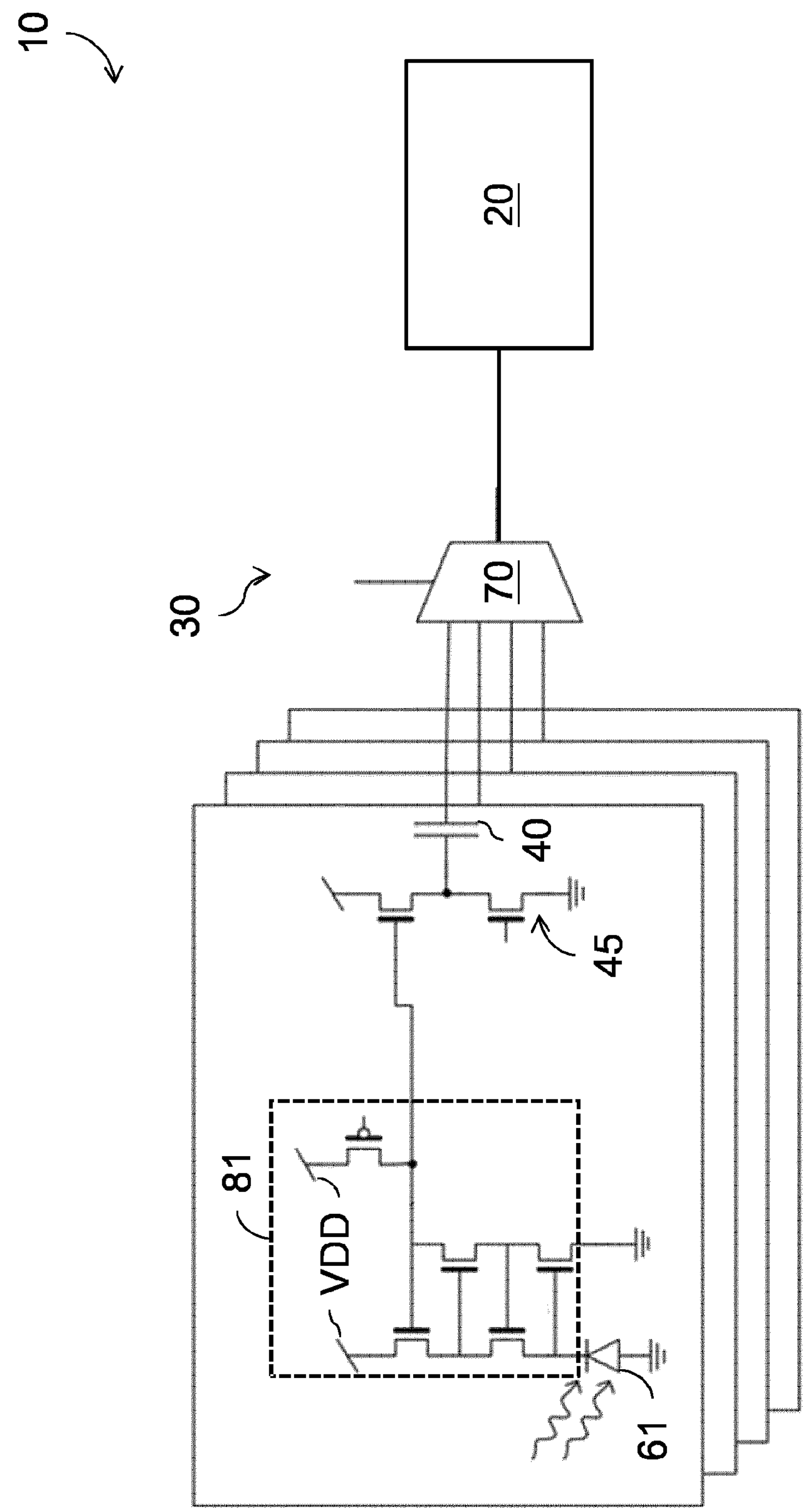
FIG. 19 is another schematic block diagram of photovoltage binning circuitry.

Another possible implementation of the circuitry 30 for switching between the first operation mode and the second operation mode is shown in FIG. 19.

Here, N pixels 51 correspond to one event detection unit 20, where N is a natural number larger than 1. The circuitry 30 comprises a multiplexer 70 for carrying out, in the first operation mode, temporal multiplexing of the voltages transferred to the N capacitors 40 to the one event detection unit 20, and, in the second operation mode, for combined transmission of the voltages transferred to the N capacitors 40 to the one event detection unit 20 at the same time.

Thus, in this case the photovoltages are not distributed spatially, but temporally. This allows usage of only a single event detection unit 20 per N pixels 51, and thus reduces the complexity of the circuitry of the sensor device 10.

While in full resolution mode, the multiplexer 70 switches the photovoltages output to the capacitors 40 of the different pixels 51 such that each photovoltage reaches the event detection unit 20 only during a predetermined time period. The time periods may be set to be equal for all pixels 51. They may however, also be dynamically adjustable, e.g. to allow more time for pixels 51 that have detected a given number of events during a given time, while reducing time for pixels 51 with less events.

In the binning mode, the multiplexer 70 operates as an adder or averaging unit and combines the photovoltages fed to all capacitors 40. The combined photovoltages are then provided to the event detection unit 20.

It has to be noted that temporal multiplexing might reduce the temporal resolution in the full (spatial) resolution mode, since photovoltage can only be processed during the time periods assigned by the multiplexer 70. However, in this manner, binning can be achieved with a less complex circuit structure.

Figure 20:
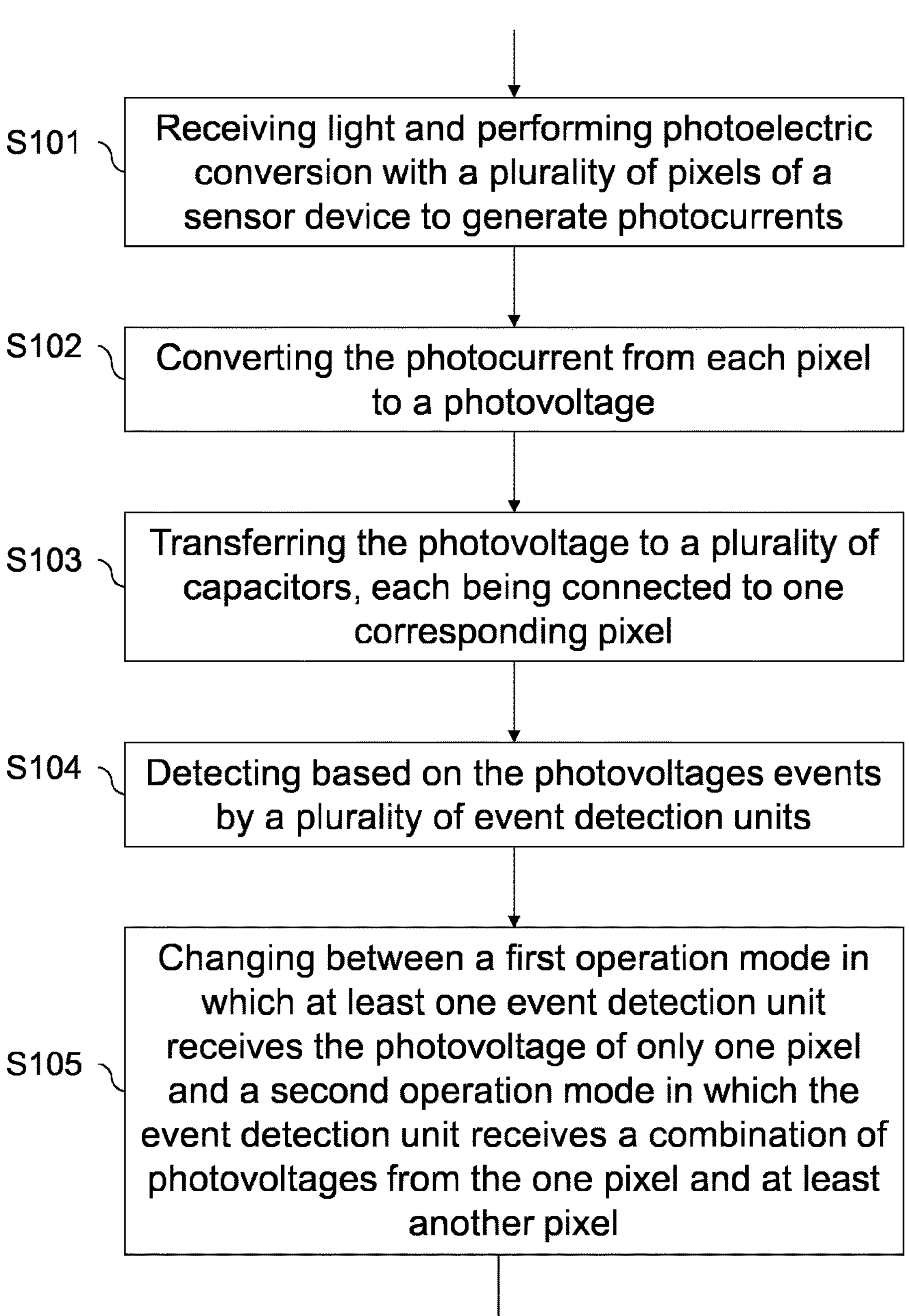
FIG. 20 illustrates schematically a process flow of a method for operating a sensor device

FIG. 20 shows a schematic process flow of a method for operating a sensor device 10 as has been described above.

At S101 light is received with a plurality of pixels 51 of the sensor device 10 and photoelectric conversion is performed to generate a photocurrent.

At S102 the photocurrent from each pixel 51 is converted to a photovoltage with a plurality of current-voltage converting sections 81, each being connected to the output of one corresponding pixel 51.

At S103 the photovoltage from each current-voltage converting section 81 is transferred to one of a plurality of capacitors 40, each being connected to the output of one corresponding current-voltage converting section 81.

At S104 by a plurality of event detection units 20, it is detected based on the photovoltages as an event when a change in light intensity received by one or several pixels 51 is above a predetermined threshold.

At S105 by circuitry 30 that connects the plurality of capacitors 40 and the plurality of event detection units 20, it is switched between a first operation mode in which at least one event detection unit 20 receives the photovoltage of only one pixel 51 via the corresponding capacitor 40, and a second operation mode in which the at least one event detection unit 20 receives a combination of photovoltages from the one pixel 51 and at least another pixel 51 via the corresponding capacitors 40.

In this manner the sensitivity of the sensor device 10 can be dynamically increased by binning photovoltages instead of photocurrents, without using an overly complex circuitry for effecting this change.

The technology according to the above (i.e. the present technology) is applicable to various products. For example, the technology according to the present disclosure may be realized as a device that is installed on any kind of moving bodies, for example, vehicles, electric vehicles, hybrid electric vehicles, motorcycles, bicycles, personal mobilities, airplanes, drones, ships, and robots.

Figure 21:
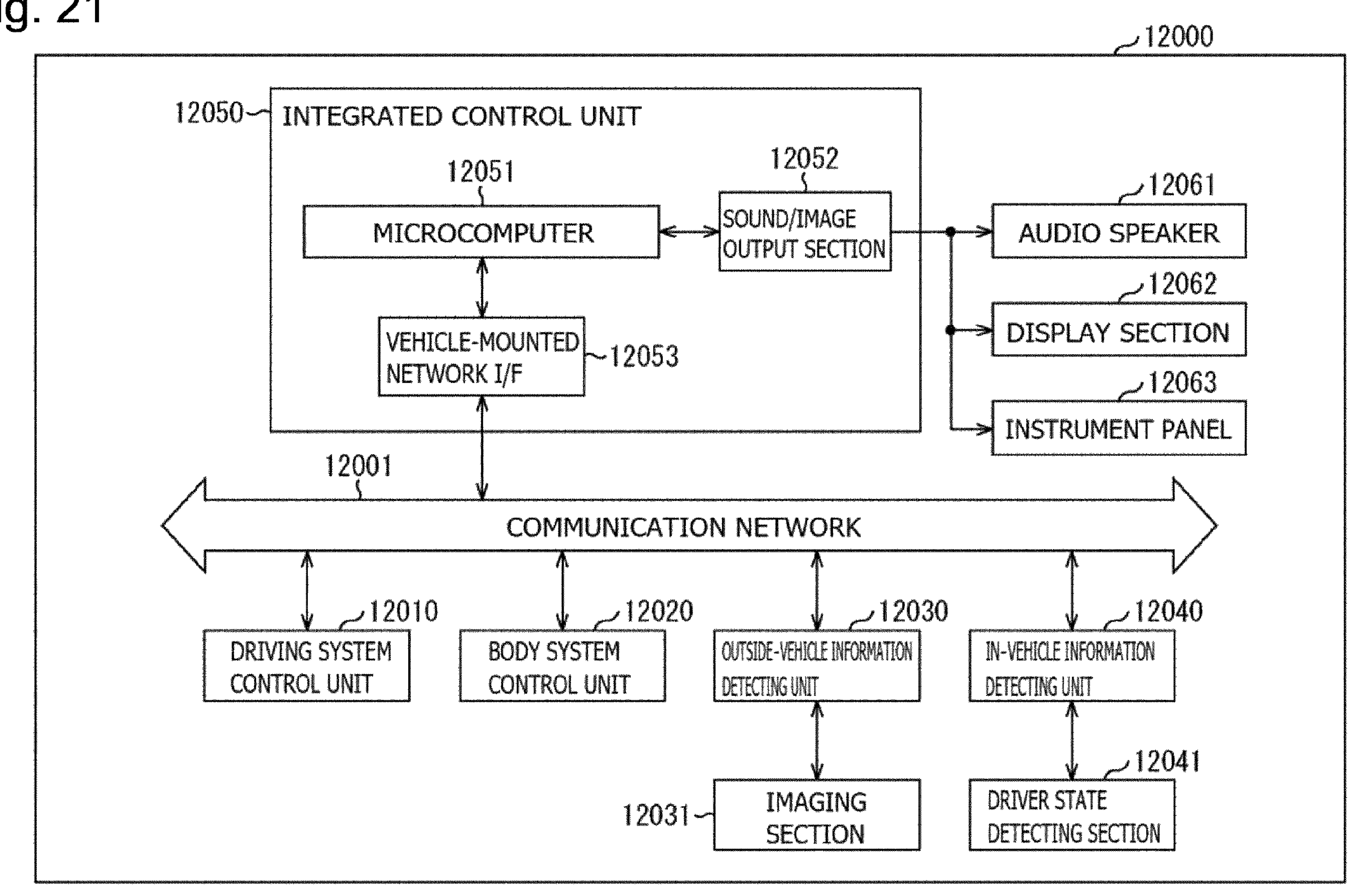
FIG. 21 is a schematic block diagram of a vehicle control system.

FIG. 21 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 21, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 21, an audio speaker 12061, a display section 12062, and an instrument panel 12063 are illustrated as the output device. The display section 12062 may, for example, include at least one of an on-board display and a head-up display.

Figure 22:
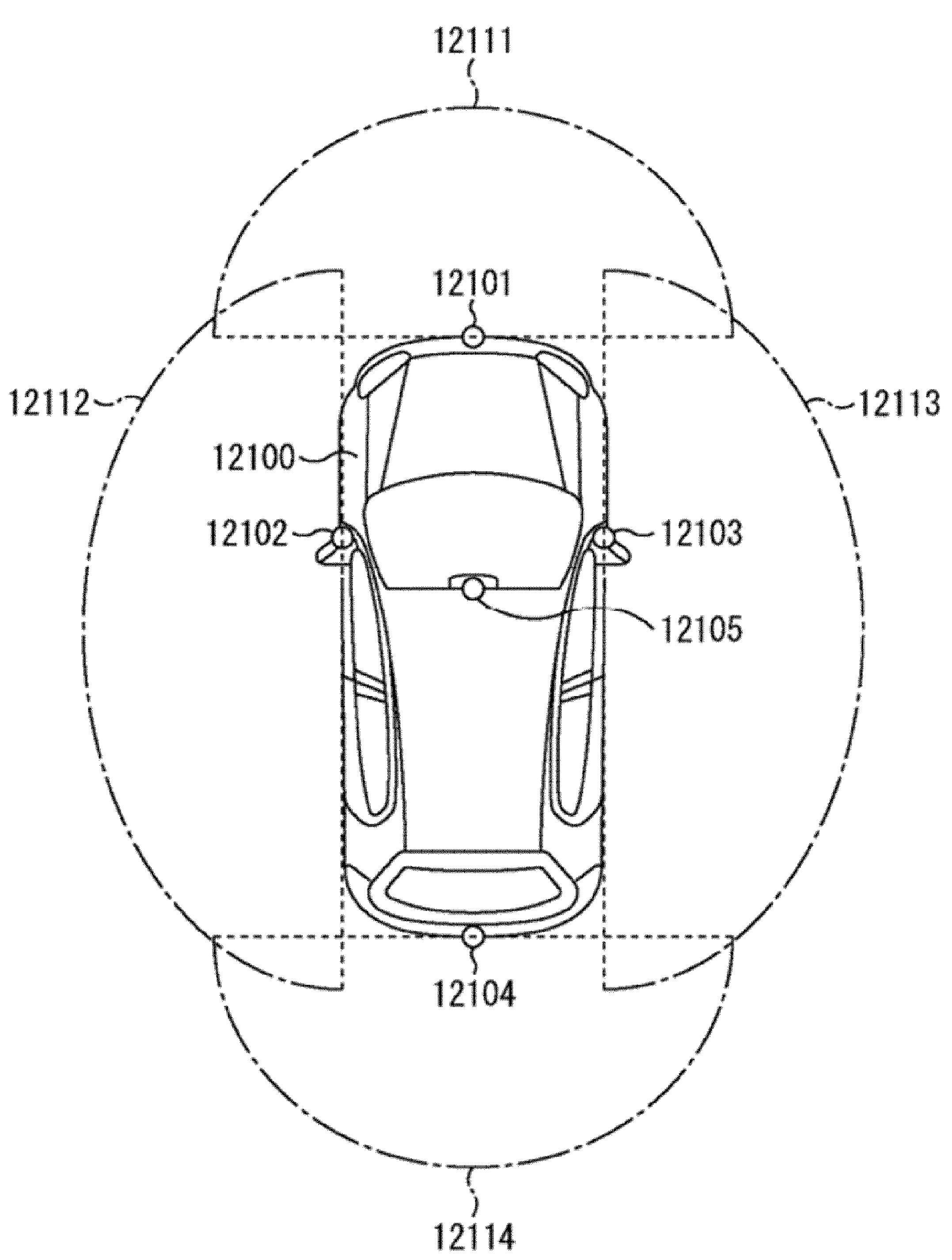
FIG. 22 is a diagram of assistance in explaining an example of installation positions of an outside-vehicle information detecting section and an imaging section.

FIG. 22 is a diagram depicting an example of the installation position of the imaging section 12031.

In FIG. 22, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 22 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure is applicable has been described above. The technology according to the present disclosure is applicable to the imaging section 12031 among the above-mentioned configurations. Specifically, the sensor device 10 is applicable to the imaging section 12031.

The imaging section 12031 to which the technology according to the present disclosure has been applied flexibly acquires event data and performs data processing on the event data, thereby being capable of providing appropriate driving assistance.

Note that, the embodiments of the present technology are not limited to the above-mentioned embodiment, and various modifications can be made without departing from the gist of the present technology.

Further, the effects described herein are only exemplary and not limited, and other effects may be provided.

Note that, the present technology can also take the following configurations.

1. A sensor device comprising:

a plurality of pixels each configured to receive light and to perform photoelectric conversion to generate a photocurrent;

a plurality of current-voltage converting sections, each being connected to the output of one corresponding pixel to convert the photocurrent from said pixel to a photovoltage;

a plurality of capacitors, each being connected to the output of one corresponding current-voltage converting section to receive the photovoltage from said current-voltage converting section;

a plurality of event detection units each configured to detect based on the photovoltages as an event whether a change in light intensity received by one or several pixels is above a predetermined threshold; and circuitry that connects the plurality of capacitors and the plurality of event detection units such as to allow changing between a first operation mode in which at least one event detection unit receives the photovoltage of only one pixel via the corresponding capacitor, and a second operation mode in which the at least one event detection unit receives a combination of photovoltages from the one pixel and at least another pixel via the corresponding capacitors.

2. The sensor device according to 1, wherein at least N pixels correspond one-to-one to N event detection units, where N is a natural number larger than 1;

the circuitry comprises switches for connecting, in the first operation mode, each of the N capacitors corresponding to the N pixels one-to-one to the N event detection units, and for connecting, in the second operation mode, the N capacitors corresponding to the N pixels to each other and to at least one of the N event detection units.

3. The sensor device according to 1, wherein at least N pixels correspond one-to-one to N event detection units, where N is a natural number larger than 1;

the circuitry comprises non-switchable first connection lines connecting the N capacitors corresponding to the N pixels one-to-one to the N event detection units, and switchable second connection lines that connect the N capacitors on the side of the event detection units; and the circuitry is configured to open the second connection lines in the first operation mode, and to close the second connection lines in the second operation mode.

4. The sensor device according to 3, wherein the circuitry comprises switches for switching off at least one and maximally (N−1) event detection units.

5. The sensor device according to 3 or 4, wherein in the second operation mode, at least two of the N event detection units operate with different predetermined thresholds.

6. The sensor device according to 5, wherein in the second operation mode, event detection by the N pixels is reset, if one event is detected by one of the N event detection units.

7. The sensor device according to any one of 3 to 7, wherein the second connection lines comprise at least one switch that is formed from an NMOS transistor and a PMOS transistor;

the NMOS transistor has its source connected to one end of the second connection line and its drain connected to the other end of the second connection line;

the PMOS transistor has its source connected to a supply voltage of the sensor device and its drain connected to the second connection line; and the gates of the PMOS transistor and the NMOS transistor are connected to each other and configured to receive the signal for opening and closing the second connection line.

8. The sensor device according to claim 1, wherein

N pixels correspond to one event detection unit, where N is a natural number larger than 1;

the circuitry comprises a multiplexer for carrying out, in the first operation mode, temporal multiplexing of the voltages transferred to the N capacitors to the one event detection unit, and, in the second operation mode, for combined transmission of the voltages transferred to the N capacitors to the one event detection unit at the same time.

9. A method for operating a sensor device (10) according to any one of 1 to 8, the method comprising:

receiving light and performing photoelectric conversion to generate a photocurrent with a plurality of pixels of the sensor device;

converting the photocurrent from each pixel to a photovoltage with a plurality of current-voltage converting sections, each being connected to the output of one corresponding pixel;

transferring the photovoltage from each current-voltage converting section to a plurality of capacitors, each being connected to the output of one corresponding current-voltage converting section;

detecting, by a plurality of event detection units, based on the photovoltages as an event whether a change in light intensity received by one or several pixels is above a predetermined threshold; and changing, by circuitry that connects the plurality of capacitors and the plurality of event detection units, between a first operation mode in which at least one event detection unit receives the photovoltage of only one pixel via the corresponding capacitor, and a second operation mode in which the at least one event detection unit receives a combination of photovoltages from the one pixel and at least another pixel via the corresponding capacitors.

The invention claimed is:

1. A sensor device comprising:

a plurality of pixels each configured to receive light and to perform photoelectric conversion to generate a photocurrent;

a plurality of current-voltage converting circuitry, each current-voltage converting circuitry being connected to an output of one corresponding pixel of the plurality of pixels and being configured to convert the photocurrent from the one corresponding pixel to a photovoltage;

a plurality of capacitors, each capacitor being connected to an output of one corresponding current-voltage converting circuitry of the plurality of current-voltage converting circuitry to receive the photovoltage from the one corresponding current-voltage converting circuitry;

a plurality of event detection circuitry downstream of the plurality of capacitors, each event detection circuitry configured to detect, as an event, whether a change in light intensity received by one or several pixels is above a predetermined threshold based on the photovoltages; and circuitry that connects the plurality of capacitors and the plurality of event detection circuitry and that is configured to change between a first operation mode in which at least one of the plurality of event detection circuitry receives the photovoltage of only one pixel via a corresponding one of the plurality of capacitors and a second operation mode in which the at least one of the plurality of event detection circuitry receives a combination of photovoltages from the one pixel and at least another pixel via two or more corresponding capacitors of the plurality of capacitors.

2. The sensor device according to claim 1, wherein at least N pixels correspond one-to-one to N event detection circuitry, where N is a natural number larger than 1;

the circuitry comprises switches for connecting, in the first operation mode, each of N capacitors of the plurality of capacitors corresponding to the N pixels one-to-one to N event detection circuitry of the plurality of event detection circuitry, and for connecting, in the second operation mode, the N capacitors corresponding to the N pixels to each other and to at least one of the N event detection circuitry.

3. The sensor device according to claim 1, wherein at least N pixels correspond one-to-one to N event detection circuitry, where N is a natural number larger than 1;

the circuitry comprises non-switchable first connection lines connecting N capacitors of the plurality of capacitors corresponding to the N pixels one-to-one to N event detection circuitry of the plurality of event detection circuitry, and switchable second connection lines that connect the N capacitors on the side of the plurality of event detection circuitry; and the circuitry is configured to open the second connection lines in the first operation mode, and to close the second connection lines in the second operation mode.

4. The sensor device according to claim 3, wherein the circuitry comprises switches for switching off at least one and maximally (N−1) event detection circuitry of the plurality of event detection circuitry.

5. The sensor device according to claim 3, wherein, in the second operation mode, at least two of the N event detection circuitry operate with different predetermined thresholds.

6. The sensor device according to claim 5, wherein, in the second operation mode, event detection by the N pixels is reset if one event is detected by one of the N event detection circuitry.

7. The sensor device according to claim 3, wherein the second connection lines comprise at least one switch that is formed from an NMOS transistor and a PMOS transistor;

the NMOS transistor has its source connected to one end of the second connection line and its drain connected to another end of the second connection line;

the PMOS transistor has its source connected to a supply voltage of the sensor device and its drain connected to the second connection line; and gates of the NMOS transistor and the PMOS transistor are connected to each other and configured to receive a signal for opening and closing the second connection line.

8. The sensor device according to claim 1, wherein

N pixels correspond to one event detection circuitry of the plurality of event detection circuitry, where N is a natural number larger than 1;

the circuitry comprises a multiplexer for carrying out, in the first operation mode, temporal multiplexing of the photovoltages transferred to N capacitors of the plurality of capacitors to the one event detection circuitry, and, in the second operation mode, for combined transmission of the photovoltages transferred to the N capacitors to the one event detection circuitry at the same time.

9. A method for operating a sensor device comprises:

receiving light and performing photoelectric conversion to generate a photocurrent with a plurality of pixels of the sensor device;

converting the photocurrent from each pixel to a photovoltage with a plurality of current-voltage converting circuitry, each current-voltage converting circuitry being connected to to an output of one corresponding pixel;

transferring the photovoltage from each current-voltage converting circuitry to a plurality of capacitors, each capacitor being connected to an output of one corresponding current-voltage converting circuitry of the plurality of current-voltage converting circuitry;

detecting, by a plurality of event detection circuitry downstream of the plurality of capacitors, as an event whether a change in light intensity received by one or several pixels is above a predetermined threshold based on the photovoltages; and changing, by circuitry that connects the plurality of capacitors and the plurality of event detection circuitry, between a first operation mode in which at least one of the plurality of event detection circuitry receives the photovoltage of only one pixel via a corresponding one of the plurality of capacitors and a second operation mode in which the at least one of the plurality of event detection circuitry receives a combination of photovoltages from the one pixel and at least another pixel via two or more corresponding capacitors of the plurality of capacitors.

10. The sensor device according to claim 1, wherein the circuitry comprises non-switchable first connection lines connecting N capacitors of the plurality of capacitors one-to-one to N event detection circuitry of the plurality of event detection circuitry, and switchable second connection lines that connect the N capacitors on the side of the plurality of event detection circuitry.

11. The sensor device according to claim 10, wherein the circuitry is configured to open the second connection lines in the first operation mode and to close the second connection lines in the second operation mode.

12. The sensor device according to claim 1, wherein the circuitry is configured to, in the first operation mode, sequentially transfer the photovoltages transferred to N capacitors of the plurality of capacitors to one event detection circuitry of the plurality of event detection circuitry, and, in the second operation mode, transfer a combination of the photovoltages transferred to the N capacitors to the one event detection circuitry at the same time.

13. The sensor device according to claim 1, wherein the plurality of pixels, the plurality of current-voltage converting circuitry, and the plurality of capacitors are formed on a single wafer.

14. The sensor device according to claim 1, wherein the plurality of event detection circuitry is arranged on a different wafer from the plurality of pixels.

15. The sensor device according to claim 13, wherein the plurality of event detection circuitry is arranged on a different wafer from the plurality of pixels.

16. The sensor device according to claim 1, wherein at least one switch in the circuitry is formed from an NMOS transistor and a PMOS transistor.

17. The sensor device according to claim 1, comprising a source follower circuit between each current-voltage converting circuitry of the plurality of current-voltage converting circuitry and each corresponding capacitor of the plurality of capacitors.

18. The sensor device according to claim 1, wherein at least one of the plurality of current-voltage converting circuitry includes four transistor stages.

19. The sensor device according to claim 1, wherein at least one of the plurality of event detection circuitry includes a current-voltage converting section, a buffer, a subtraction section, a quantization section, and a transfer section.

* * * * *